United States Patent
Onusko et al.

(10) Patent No.: US 9,773,052 B2
(45) Date of Patent: Sep. 26, 2017

(54) DOCUMENT RECONSTRUCTION FROM EVENTS STORED IN A UNIFIED CONTEXT-AWARE CONTENT ARCHIVE

(71) Applicant: Actiance, Inc., Redwood City, CA (US)

(72) Inventors: John Onusko, Garden Valley, CA (US); Suresh Marur, Bangalore (IN); Jeffrey T. Lucas, Mountain View, CA (US); Sandeep Mohanty, Sunnyvale, CA (US); Ramakrishna Neeli, Bangalore (IN)

(73) Assignee: ACTIANCE, INC., Redwood City, CA (US)

( * ) Notice: Subject to any disclaimer, the term of this patent is extended or adjusted under 35 U.S.C. 154(b) by 519 days.

(21) Appl. No.: 14/286,795

(22) Filed: May 23, 2014

(65) Prior Publication Data

US 2015/0339370 A1 Nov. 26, 2015

(51) Int. Cl.
G06F 17/30 (2006.01)
H04L 29/06 (2006.01)
G06Q 10/10 (2012.01)

(52) U.S. Cl.
CPC ....... *G06F 17/30595* (2013.01); *G06Q 10/10* (2013.01); *H04L 63/10* (2013.01)

(58) Field of Classification Search
CPC ....... H04L 12/581; H04L 51/04; H04L 51/10; H04L 65/403; G06F 8/71; G06F 17/2247; G06F 3/0482; G06F 3/04842
See application file for complete search history.

(56) References Cited

U.S. PATENT DOCUMENTS 7,143,091 B2 11/2006 Charnock et al.
8,041,675 B1 * 10/2011 McCain .............. G06F 11/2094
 707/640

(Continued)

OTHER PUBLICATIONS

Dalila Mekhaldi—"Multimodal Document Alignment: towards a Fully-indexed Multimedia Archive"—SIGIR'07, Jul. 23-27, 2007, Amsterdam, The Netherlands. Copyright 2007 ACM—multimedia information retrieval workshop, SIGIR, 2007—rgcl.wlv.ac.uk—pp. 1-7.

(Continued)

*Primary Examiner* — Dung K Chau
(74) *Attorney, Agent, or Firm* — Kilpatrick Townsend & Stockton LLP

(57) ABSTRACT

A unified context-aware content archive system allows enterprises to manage, enforce, monitor, moderate, and review business records associated with a variety of communication modalities. The system may store an information infoset derived or inferred from one or more documents representing communications according to the variety of communication modalities as interaction transcripts. An interaction transcript represents interactions between participants through the documents rather than the documents themselves allowing for derivation or inference of communication events, chronologies, and mappings to be stored in a common data structure. In one aspect, events correlation is provided between participants of communications that can be established by general time series analysis for the purposes of extracting meaningful statistics and interaction contexts and other characteristics of data. In another aspect, chronological mappings are provided of conversations between an established start and end time frame.

14 Claims, 17 Drawing Sheets

(56) References Cited

U.S. PATENT DOCUMENTS

| | | |
|---|---|---|
| 2003/0220917 A1 | 11/2003 | Copperman et al. |
| 2003/0229900 A1* | 12/2003 | Reisman ........... G06F 17/30873 |
| | | 725/87 |
| 2004/0025110 A1 | 2/2004 | Hu |
| 2004/0034834 A1 | 2/2004 | Pirie et al. |
| 2005/0216503 A1 | 9/2005 | Charlot et al. |
| 2005/0278340 A1 | 12/2005 | Rehberg et al. |
| 2006/0143034 A1* | 6/2006 | Rothermel ............. G06Q 10/10 |
| | | 705/301 |
| 2008/0010629 A1 | 1/2008 | Berg et al. |
| 2008/0065471 A1 | 3/2008 | Reynolds et al. |
| 2008/0118051 A1 | 5/2008 | Odinak et al. |
| 2008/0195576 A1 | 8/2008 | Sande et al. |
| 2009/0254572 A1 | 10/2009 | Redlich et al. |
| 2010/0138756 A1* | 6/2010 | Saund ................ H04L 12/1827 |
| | | 715/758 |
| 2010/0250497 A1 | 9/2010 | Redlich et al. |
| 2010/0257140 A1 | 10/2010 | Davis et al. |
| 2011/0122866 A1 | 5/2011 | Vasamsetti et al. |
| 2011/0202947 A1 | 8/2011 | Gupta et al. |
| 2011/0302025 A1 | 12/2011 | Hsiao et al. |
| 2012/0197871 A1 | 8/2012 | Mandel et al. |
| 2012/0200567 A1 | 8/2012 | Mandel et al. |
| 2012/0330869 A1 | 12/2012 | Durham |
| 2013/0024492 A1* | 1/2013 | Graff .................. G06Q 10/1091 |
| | | 709/202 |
| 2013/0203038 A1 | 8/2013 | Kumar et al. |
| 2014/0100128 A1* | 4/2014 | Narain ............... G01N 33/6893 |
| | | 506/9 |
| 2014/0143018 A1 | 5/2014 | Nies et al. |
| 2014/0343973 A1 | 11/2014 | Ruszala et al. |
| 2015/0033139 A1 | 1/2015 | Thiel et al. |
| 2015/0039565 A1 | 2/2015 | Lucas |
| 2015/0074579 A1 | 3/2015 | Gladstone et al. |
| 2015/0205770 A1* | 7/2015 | Shershevsky ......... G06F 3/0481 |
| | | 715/202 |

OTHER PUBLICATIONS

Bunt et al.—"Fusion and Coordination for Multimodal Interactive Information Presentation—Roadmap, Architecture, Tools, Semantics"—Intelligent Information Presentation, 2003 Kluwer Academic Publishers. Printed in The Netherlands—Multimodal Intelligent Information Presentation, vol. 27, 2005—Springer—academia. edu—pp. 1-17.

U.S. Appl. No. 15/411,798, filed Jan. 20, 2017.

* cited by examiner

DOCUMENT RECONSTRUCTION FROM EVENTS STORED IN A UNIFIED CONTEXT-AWARE CONTENT ARCHIVE

CROSS-REFERENCE TO RELATED APPLICATIONS

This application is related to co-pending U.S. patent application Ser. No. 13/957,154, filed Aug. 1, 2013 and entitled "UNIFIED CONTEXT-AWARE CONTENT ARCHIVE SYSTEM," the entire disclosure of which is incorporated herein by reference.

BACKGROUND OF THE INVENTION

Embodiments of the present invention generally relate to techniques for processing and archiving electronically stored information (ESI). More particularly, the present inventions relates to techniques for time series analysis and processing on context-aware data.

Collaboration using a variety of communication mediums, such as e-mail and instant messaging, voice over Internet Protocol (VoIP), and social networks is becoming increasingly ubiquitous. Many users and organizations have transitioned to paperless or all-digital offices, where information and documents are communicated and stored almost exclusively digitally. As a result, users and organizations are also now expended time and money to store and archive increasing volumes digital documents and data.

At the same time, state and federal regulators, such as the Securities and Exchange Commission (SEC), have become increasingly aggressive in enforcing regulations relate to electronically stored information. Additionally, criminal cases and civil litigation frequently employ use of electronic discovery (eDiscovery) tools, in addition to traditional discovery methods.

Clearly, one problem with the increasing volumes digital documents and data the accumulate is how the data is later accessed and retrieved. As broadband connections to the Internet are common in most homes and business, emails frequently include one or more multi-Megabyte attachments, instant messaging sessions are used to transfer files and pictures, use of social networking applications have exploded, voice/video conferences are routinely held. As users grow accustomed to communicating using a variety of communication mediums, the electrically stored data associated with each different communication medium becomes increasingly of diverse and, if propriety formats are used, later access to the data becomes difficult without the required software. Another problem is that organization-based or regulatory-based disclosure and/or reporting requirements do not simply require that the information be preserved and then disclosed. Often, the disclosure and/or reporting requirements are more directed toward the context of the communication, such as the level of access one or more participants had to sensitive data referred to in the contents of a given electronic communication.

For these reasons, the inventors believe that users and organizations need a unified context-aware content archive to help lower costs managing and disclosing electronically stored information. Accordingly, what is desired is to solve problems relating to storing electronic communications using multiple different communication modalities, some of which may be discussed herein. Additionally, what is desired is to reduce drawbacks relating to searching for contexts between stored electronic communications, some of which may be discussed herein.

BRIEF SUMMARY OF THE INVENTION

The following portion of this disclosure presents a simplified summary of one or more innovations, embodiments, and/or examples found within this disclosure for at least the purpose of providing a basic understanding of the subject matter. This summary does not attempt to provide an extensive overview of any particular embodiment or example. Additionally, this summary is not intended to identify key/critical elements of an embodiment or example or to delineate the scope of the subject matter of this disclosure. Accordingly, one purpose of this summary may be to present some innovations, embodiments, and/or examples found within this disclosure in a simplified form as a prelude to a more detailed description presented later.

In various embodiments, a unified context-aware content archive system provides an information storage and retrieval system that allows enterprises to manage, enforce, monitor, moderate, and review business records associated with a variety of communication modalities. A unified context-aware content archive system according to some embodiments may store an information infoset derived or inferred from one or more documents representing communications according to the variety of communication modalities as interaction transcripts.

An interaction transcript represents interactions between participants through the documents rather than the documents themselves allowing for derivation or inference of communication events, chronologies, and mappings to be stored in a common data structure. In one aspect, events correlation is provided between participants of communications that can be established by general time series analysis for the purposes of extracting meaningful statistics and interaction contexts and other characteristics of data. In another aspect, chronological mappings are provided of conversations between an established start and end time frame. In yet another embodiment, sequential mappings are provided of interactions, conversations, threads, posts made without timestamps. In some aspects, correlations are provided using multivariate modalities that allow for expressiveness of chronological mappings of inter and intra events.

In various embodiments, a snapshot generated as a logical storage structure identifying the reconstruction of a timeline based on communication transcripts correlated by event metadata. A "Live" document process is used to apply a "most significant snapshot" in the context aware content storage. "Live" is a euphemism for system and process adaption by the data processing engine due to asynchronous and real-time events in response to an incoming transcript, context or execution-route request. A living document refers to a document or set of documents that take on a dynamic nature. The document or set of documents may be subject to constant changes in that there may be one or more mechanisms at work that are continuously updating, editing, and stamping the documents or versions related thereto with a new data revision. The materialized artifact of a living document is generated in the form of a snapshot.

A further understanding of the nature of and equivalents to the subject matter of this disclosure (as well as any inherent or express advantages and improvements provided) should be realized in addition to the above section by reference to the remaining portions of this disclosure, any accompanying drawings, and the claims.

BRIEF DESCRIPTION OF THE DRAWINGS

In order to reasonably describe and illustrate those innovations, embodiments, and/or examples found within this disclosure, reference may be made to one or more accompanying drawings. The additional details or examples used to describe the one or more accompanying drawings should not be considered as limitations to the scope of any of the claimed inventions, any of the presently described embodiments and/or examples, or the presently understood best mode of any innovations presented within this disclosure.

DETAILED DESCRIPTION OF THE INVENTION

Figure 1:
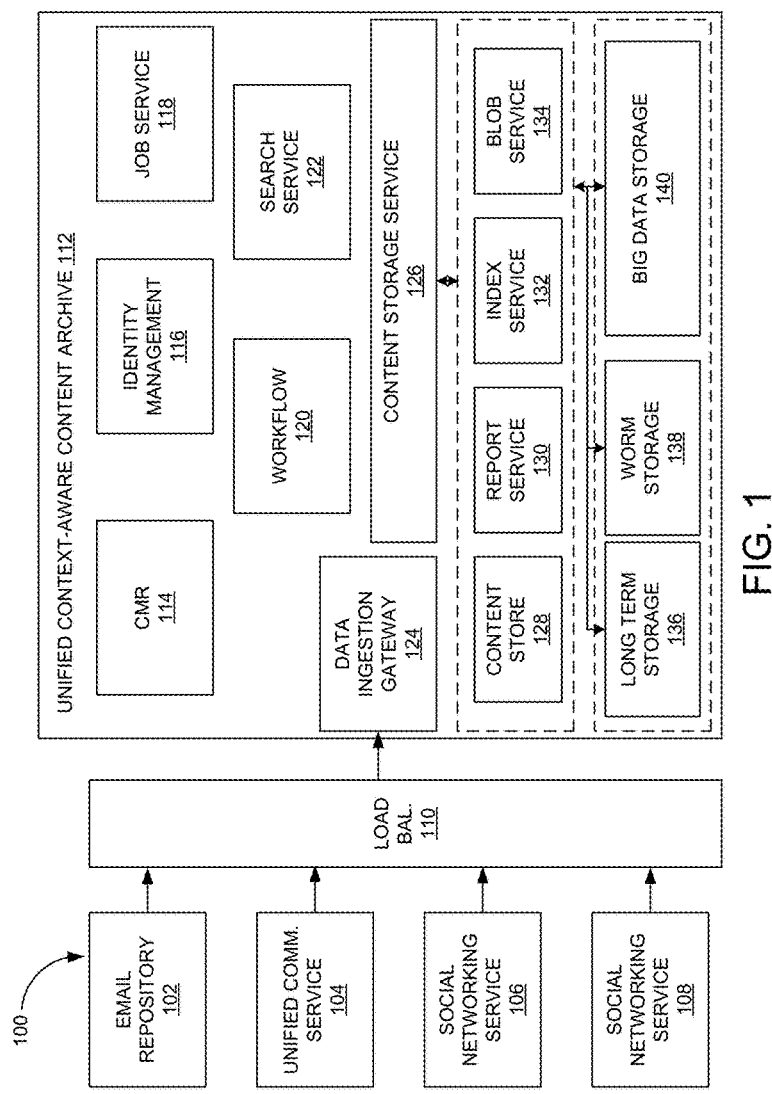
FIG. 1 is a block diagram of an electronically stored information system according to one embodiment of the present invention.

In various embodiments, a unified context-aware content archive system provides an information storage and retrieval system that allows enterprises to manage, enforce, monitor, moderate, and review business records associated with a variety of communication modalities. A unified context-aware content archive system according to some embodiments may store an information infoset derived or inferred from one or more documents representing communications according to the variety of communication modalities as interaction transcripts. An interaction transcript represents interactions between participants through the documents rather than the documents themselves allowing for derivation or inference of communication events, chronologies, and mappings to be stored in a common data structure. In one aspect, events correlation is provided between participants of communications that can be established by general time series analysis for the purposes of extracting meaningful statistics and interaction contexts and other characteristics of data. In another aspect, chronological mappings are provided of conversations between an established start and end time frame. In yet another embodiment, sequential mappings are provided of interactions, conversations, threads, posts made without timestamps. In some aspects, correlations are provided using multivariate modalities that allow for expressiveness of chronological mappings of inter and intra events.

Furthermore, the unified context-aware content archive system allows for the time series analysis and processing on context-aware data stored by the archive system. In some embodiment, the archive system constructs a timeline-based conservation view from input provided from any data source represented as a normalized communication transcript. As used herein, a conversation view is a graphical presentation executed by an external program to provide further insights in the discovery process with details about the event, correlation, relationship, or mapped context of the content using specialized parameters. Conversation views are derived from snapshot construction.

Terminology

To assist in the understanding of this disclosure, the following provides general definitions of a number of terms and phrases used herein with a view toward aiding in the comprehension of such terms and phrases. As space limitations preclude full delineation of all meanings, the general definitions that follow should be regarded as providing one or more intended meanings of the terms and phrases. Unless otherwise specified, the general definition should not be viewed as being an exhaustive list or otherwise excluding the ordinary plain and plain meanings of the terms or phrases.

Interaction—An interaction generally refers to an unbounded or bounded sequence or series of communication events according to one or more of a plurality of communication modalities. An interaction may include one or more participants participating during each communication event.

Interaction Transcription Model (ITM)—An ITM models the transcript of one or more interactions described by electronic data delivered over one or more of a plurality of communication modalities. In some embodiments, a capture point is configured to produce an ITM object and then submit the ITM to a universal context-aware data storage system, such as the unified context-aware content archive system referred to herein.

Communication Modality—A communication modality generally refers to a communication classification reflecting base characteristics of one or more channels and/or networks as a means to collaborate between one or more participants over one or more chosen communication mediums. Some examples of communication modalities for purposes of this disclosure include electronic mail (email), instant messaging/chat, web collaboration, video conferencing, voice telephony, social networks, and the like. For purposes of this disclosure, four super classes of communication modalities are explained to generalize most communication forms. These super classes include: Email, Unified Communications, Collaboration, and Social Networks.

Email—An email communication modality generally refers to a class of communication media or a medium that models non-realtime electronic communication. One example of a non-realtime electronic communication is electronic mail (email or e-mail). Email is typically a ubiquitous form of communication between one or more participants (e.g., a sender and one or more recipients). As used herein, an electronic communication may include one or more documents (e.g., emails represented in one or more of a plurality of forms) that serve as a basis for one or more business records.

Unified Communication—A unified communication modality generally refers to a class of communication media or a medium that models real-time or substantially real-time communication. Some examples of unified communications includes instant messaging, voice (analog and digital), VoIP, etc. Unified communication is also typically a ubiquitous form of communication between one or more participants and, as used herein, may include one or more documents (e.g., IM/Chat sessions, voicemail, etc. represented in one or more of a plurality of forms) that serve as a basis for one or more business records.

Collaboration—A collaboration communication modality generally refers to multiple classes of communication media that encapsulate a plurality of communication modalities. A collaboration is typically represented as a unique or unified thread of communication. A collaboration can therefore be referred to as a multi-variant modality. In one example of a communication, Alice starts a WebEx session related to corporate information with Bob. Bob engages in an instant messaging (IM) session with Charlie who is a subject matter expert on the corporate information and who also is not an employee of the company that employs Alice and Bob. Bob then sends an email to one or more participants external to the company to further discuss the corporate information and the IM session with Charlie. This collaboration example contains at least three communication modalities starting with the WebEx session, the IM session, and Bob's email. A collaboration communication modality may be represented in one or more of a plurality of forms that serve as a basis for one or more business records.

Social Network—A social network communication modality generally refers to one or more interactions among specialized social networks or communities. In general, modern day social networking software platforms are designed to engage, promote or foster social interactions among communities such as family members, peers, specialized social networks/communities, and enterprise collaborators. Examples of social networks include Facebook, Twitter, Linked-In, etc. A social network communication modality may be represented in one or more of a plurality of forms that serve as a basis for one or more business records.

A content-agnostic storage system as used herein generally represents hardware and/or software elements configured for storing entities representing a definition of an interaction between one or more participants according to a variety of communication modalities. The system may perform the managing, integrating, and searching of data associated with the storage and retrieval of models of various interactions. Some examples of storage resources include data storage independent solutions using RDBMS, XML Repositories, File Systems, and Key-Value storage; aka Big Data storage.

A context-aware search engine as used herein generally represents hardware and/or software elements configured for indexing and searching data associated with the storage and retrieval of models of various interactions. Some examples include Web Scale Full-Text Search distributed server farms and Tuple-based Search using Relations. This may include a convergence of RDBMS and Big Data Search for context-aware indexing and searches.

A data capture system as used herein generally represents hardware and/or software elements configured for capturing content associated with one or more communication modalities. Content may be captured as wired (transport datagram) and application data. In various embodiments, content may be captured as documents formatted according to known protocols or standards for messages of particular communication modalities. Content may be processed to derive interaction transcripts for storage into a content-agnostic storage system for the purposes of compliance enforcement, moderation, and review as discussed further herein.

A data capture system may capture content using a variety of mechanisms. In one example, data at rest as used herein generally refers to one or more means for processing and/or enriching data that is classified as being resident in a storage or repository system. Typically, the data is to be read into a volatile state (memory), processed (enriched, mutated, analyzed, etc), and then placed back into storage, such as persistent storage. Data in motion as used herein generally refers to one or more means for capturing, extracting, enriching, tracking, or otherwise processing data classified as participating in real-time events. Typically, the data is transient and thus held in volatile state even if it is traversing a wire or wireless transport.

Big Data as used herein generally refers to any technology that makes use of key-value storage. Big Data typically includes computation as a basis of a distributed file system or a collection of server farms using commodity hardware and storage. Big Data can be used strictly for: Scaling Storage (infinite storage), Scaling Computing/Processing Power, or Both. Big Data can also be used for: Public Cloud, Private Cloud, Private Data Center, On-Premise, or Hybrid Cloud/Data Center.

Multi-Variant Index—A multi-variant index as used herein generally refers to the application of cross-indexes used as an aggregated form to derive a single and normalized searchable content from the view point of the application. This requires use of multi-variables (dimensions) to generate the composite index which may be virtualized across segments (shards) on distributed nodes or server farms. A single index usually comes in the form of a reverse index which is a means to compute document addresses (locations) in a single file. This allows for O[c] constant lookup of documents.

Conversation Timeline—A conversation timeline as used herein generally refers to a visualization artifact represented by a user interface application that displays a series of transcript events bounded by a time frame and connected by a correlation of the conversation in context. The correlation can be mapped by global communication id, subject or topic of the conversation. Additional mappings can be based on a hierarchy of relationships indicating sub contexts, events or conversations. The ITM allows for any visual re-construction via intelligent visual analytics tools.

Conservation Document—A conversation document as used herein generally refers to a normalized document structure that encapsulation interaction metadata, text events (body of an email, content of a user blog, text message of an IM program), file events (the binary representation of an email attachment, video file, audio recording, etc.), and information about the participants (person info).

Snapshot—A snapshot as used herein generally refers to a logical storage structure identifying the reconstruction of a timeline based on communication transcripts correlated by the event metadata.

"Live" document Processing—Such processing as used herein generally refers to the process of applying a "most significant snapshot" in the context aware content storage. "Live" is a euphemism for system and process adaption by the data processing engine due to asynchronous and real-time events in response to an incoming transcript, context or execution-route request.

Living document—A living document as used herein generally refers to a document or set of documents that take on a dynamic nature. Primarily the assumption is that the document or set of documents are subject to constant changes in that there are one or more mechanisms at work that are continuously updating, editing, and stamping the documents or versions related thereto with a new data revision. A Blogging application or internal content management system are examples of applications that generate living documents. As discussed further below, the materialized artifact of a living document, so called snapshots, are constructed to represent one or more timelines based on communication transcripts captured by capture endpoints and correlated by event metadata from which one or more instances of a living document may be recreated. A living document may include "dead, static" and "living" elements or communication objects.

Event-metadata—Event-metadata as used herein generally refers to Key Meta-information signifying one or more of the following attributes (Note there may be more):

Global communication id

An action event time stamp (create, updated, started, edited, deleted, modified etc. time signature corresponding to precisely when the action occurred).

Information about the individual, we refer to this as the participant. A person responsible for the event action. For example, someone who created and submitted an email, added a blog entry to a form, created an electronic document and uploaded to a SharePoint repository, authorship of a telephony or video recording.

Electronically Stored Information System

FIG. 1 is a block diagram of electronically stored information (ESI) system 100 according to one embodiment of the present invention. ESI system 100 may incorporate various embodiments or implementations of the one or more inventions presented within this disclosure. In this example, ESI system 100 includes email repository 102, unified communications service 104, social networking service 108, load balancer 110, and unified context-aware content archive 112. FIG. 1 is merely illustrative of an embodiment or implementation of an invention disclosed herein should not limit the scope of any invention as recited in the claims. One of ordinary skill in the art may recognize through this disclosure and the teachings presented herein other variations, modifications, and/or alternatives to those embodiments or implementations illustrated in the figures.

Email repository 102 is representative of one or more hardware and/or software elements from which electronically stored information related to an email communication modality may be obtained. Email repository 102 may provide access to one or more email modality documents and associated metadata. Email repository 102 may act as an email storage service, an email service, an email gateway, or the like. One example of the email repository 102 is a computer system running Microsoft Exchange Server from Microsoft Corporation of Redmond, Wash. In other examples, email repository 102 may include operating systems, such as Microsoft Windows™, UNIX™, and Linux™, and one or more mail transport agents, mail user agents, and the like. Email communications may be stored on email repository 102 or accessibly therefrom in a file, such as an Outlook PST file or mbox file, in a database, or the like.

Unified communications service 104 is representative of one or more hardware and/or software elements from which electronically stored information related to a unified communication modality may be obtained. Unified communications service 104 may provide access to one or more unified communication modality documents and associated metadata. Unified communications service 104 may provide access to real-time communication services such as instant messaging (chat), presence information, telephony (including IP telephony), video conferencing, data sharing (including web connected electronic whiteboards aka IWB's or Interactive White Boards), call control and speech recognition. Unified communications may be stored on unified communications service 104 or accessibly therefrom in a file, in a database, or the like.

Collaboration service 106 is representative of one or more hardware and/or software elements from which electronically stored information related to a collaboration communication modality may be obtained. Collaboration service 106 may provide access to one or more collaboration modality documents and associated metadata. Collaboration service 106 communications may be stored on collaboration service 106 or accessibly therefrom in a file, in a database, or the like.

Social networking service 108 is representative of one or more hardware and/or software elements from which electronically stored information related to a social network communication modality may be obtained. Social networking service 108 may provide access to one or more social network communication modality documents and associated metadata. A social network is a social structure made up of a set of social actors (such as individuals or organizations) and a complex set of the dyadic ties between these actors. Social networking service 108 may provide information about the social structure, the social actors, and the ties between the actors. Social networking service 108 may further provide information related to electronic communications made via one or more applications that host the social network.

In various embodiments, social networking service 108 provides monitoring in real-time and aggregating "social media" into a communication form that can be managed holistically using compliance protocols for the regulated industries. Accordingly, social media interactions may be collected for general storage and later search-ability. In one aspect, a social media interaction may include time points of communication events (e.g., an event transcript). Events may be determined corresponding to create, posts, updates, edit, modifications, deletion etc. on artifacts associated with ESI systems. In another aspect, events may correspond to a blog, a chat, a video session, an audio recording, an instance message, a tweet, a newly constructed web page on a Portola site, a phone call, a television feed. These can be classified in real-time as predetermined events such as tweets, news alerts, Facebook posts, linked-in events, etc.

In further embodiments, social networking service 108 provides a connection context. For example, social networking service 108 may determine participants involved in the communication that can be mapped to a logical social graph. Social networking service 108 may derive in-band and out-of-band context. In-band for purposes of this disclosure mean contexts within a social media platform, such as Salesforce, LinkedIn, Facebook, Tweeter, MSN, Google+, etc. Social networking service 108 may use a native API to obtain metadata within a social network API. Out-of-band for purposes of this disclosure implies unrelated or disparate interconnects of social media networks (LinkedIn, Facebook, Twitter, etc.). To employ out-of-band information, social networking service 108 may employ normalization of metadata enrichment and aggregation of an information domain. Accordingly, a fuller context is provided of a participant's inter-connections and intra-connections to other participants across any social network domain. In other words, intra is more about in-band single social network domain and inter is about using plurality of 2 or more social network domains (e.g., the application of across and heterogeneous networks and/or social media platforms, such as Facebook, Tweeter, LinkedIn, Microsoft, Google, Apple, Bloomberg, etc.).

Figure 13:
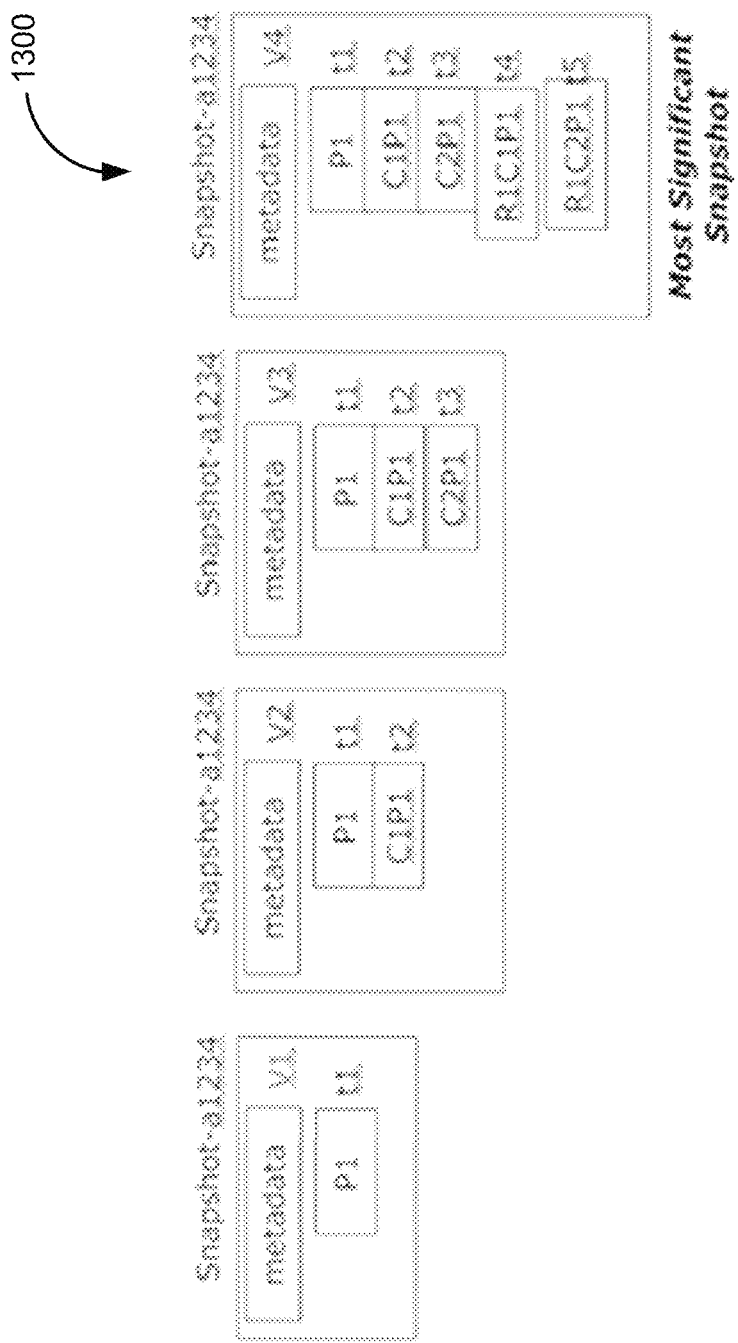
FIG. 13 illustrates a snapshot generated in response to a blogging application streaming a reply to a comment event for a blog in one embodiment.
Figure 14:
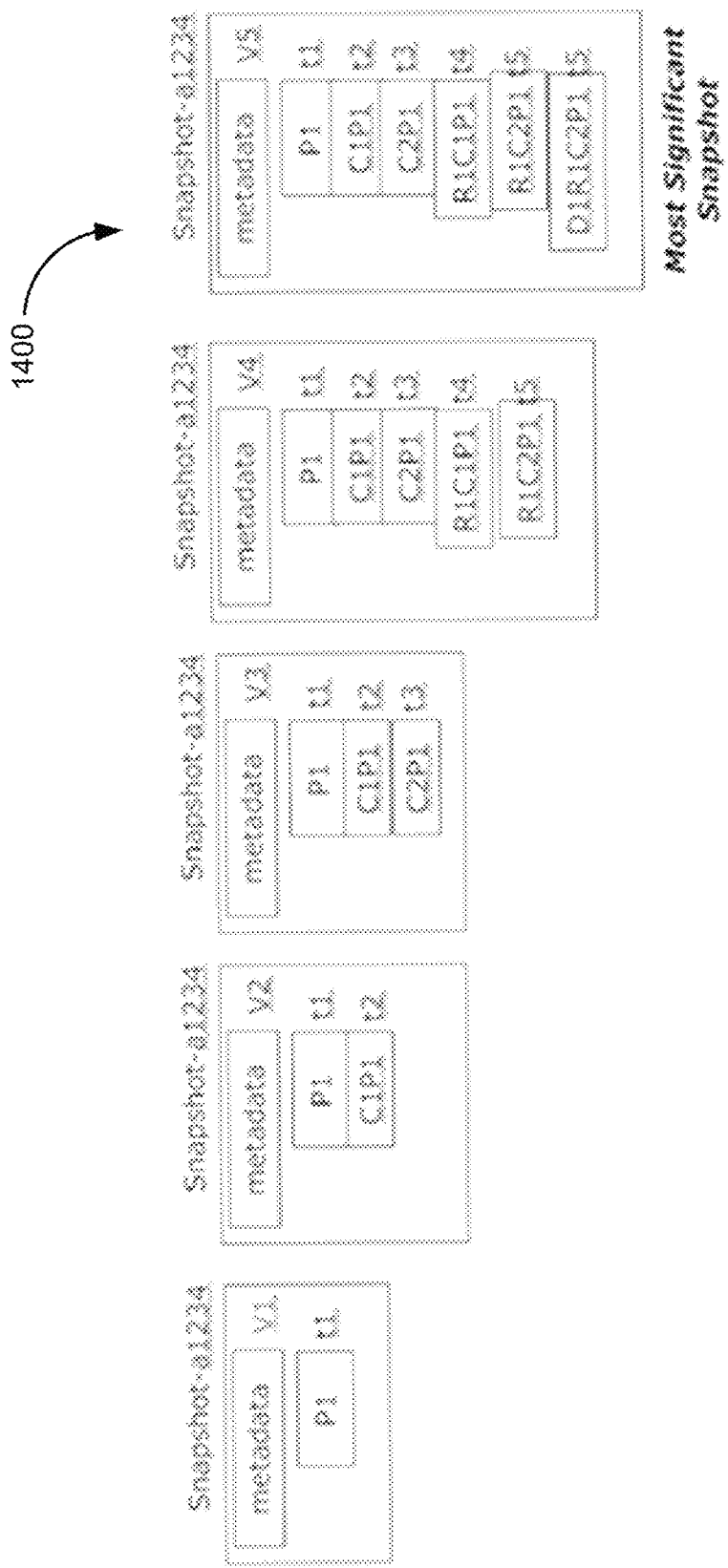
FIG. 14 illustrates a snapshot generated in response to a blogging application streaming a comment delete event for a blog in one embodiment.

FIGS. 13-14 are illustrations of social media graphs 1300 and 1400 in various embodiments according to the present invention. In one aspect, ESI system 100 utilizes an in-band approach to derive social media-ware connections (intra-connections). For example, ESI system 100 (or social networking service 108) may use native API from supporting social media platforms and enrich data captured from the API with metadata at the capture point. Interaction may be synthesized into a normalized information set that may be stored locally for passive processing, for example, events (such as real-time and non-real-time) may be synthesized in a de-normalized information set that may be stored transiently for a short period of time and pushed for normalized staging and downstream processing. In one aspect, a social graph may be derived by using native API if a social platform (network) supports it. If none is present, social networking service 108 may enrich the context at the capture point with such information.

A social graph may be n-deep at the end of a termination chain (e.g., the last participant in a communication chain). Conversation can be bounded by system/application context. For example, an email participants' direct communication may be determined by the members on the "To:" list of an originating email. Each hop via traversing the participant's "To:" designator determines a "hop" or closed loop or ring of a graph. The scale of participants may be determined by the closed loop/ring or hops (i.e., the depth of the graph).

In various embodiments, out-of-band social connections may be derived by processing information based on subnets. This implication is that information is synthesize at the source of the capture point in the case where the information is already normalized by the capture point, for example, during passive processing. Data is at rest and waiting to be collected by upstream applications. Secondly, the total sum of information regarding inter-connection may be obtained by merging the aggregated sets into one normalized form. This may be done at two possible points of interests: a) the capture point (the point product or 3rd party application/connector) and within ESI system 100 at a normalization stage. ESI system 100 therefore captures "connections" within activities or interactions across different domains using real-time event streaming protocols or generalized capture points for data collection processing purposes.

Referring again to FIG. 1, load balancer 110 is representative of one or more hardware and/or software elements that distribute the workload of obtaining the different communication modalities from email repository 102, unified communications service 104, collaboration service 104, and social networking service 108 across multiple computers or a computer cluster, network links, central processing units, disk drives, or other resources, to achieve optimal resource utilization, maximize throughput, minimize response time, and avoid overload.

Unified context-aware content archive 112 includes hardware and/or software elements configured to obtain electronically stored information related to multiple communication modalities and store interaction transcripts determined therefrom in a single information structure. In one example of operation, unified context-aware content archive 112 obtains electronic communications from email repository 106, unified communications service 108, collaboration service 108, and social networking service 110 via load balancer 110. Unified context-aware content archive 112 may obtain electronic communications using a variety of known techniques, such as push or pull mechanisms. In one embodiment, unified context-aware content archive 112 may obtain electronic communications directly or indirectly through a service that monitors electronic communications in real-time or in-non real-time.

In various embodiments, unified context-aware content archive 112 is configured to receive electronic communications according to the above various communication modalities and processes documents representing the electronic communications to determine interactions between one or more participants. A series of events that form the interactions may be modeled as a single information structure facilitating storage and retrieval. Unified context-aware content archive 112 can store content in a searchable form via normalization into the single information structure that is retrievable based on contexts derived or inferred from the single information structure. Unified context-aware content archive 112 may incorporate a variety of traditional storage mechanisms (e.g., relational databases) and non-traditional storage mechanisms (e.g., Big Data).

In this example, unified context-aware content archive 112 includes content management repository (CMR) module 114, identity management module 116, job service module 118, workflow module 120, search service module 122, data ingestion gateway module 124, content storage service module 126, content store module 128, report service module 130, index service module 132, blob service 134, long term storage module 136, WORM storage module 138, and big data storage module 140.

Content management repository (CMR) module 114 represents hardware and/or software elements configured for managing an organization's content. CMR module 114 may incorporate technology to store and index, classify, search and retrieve objects of all types. CMR module 114 may be used by unified context-aware content archive 112 in the processing of or enrichment of electronic communications, management of data, and the like.

Identity management module 116 represents hardware and/or software elements configured for managing individual identifiers, their authentication, authorization, and privileges within or across system and organization boundaries. Identity management module 116 may be used by unified context-aware content archive 112 in the processing of or enrichment of electronic communications.

Job service module 118 represents hardware and/or software elements configured for managing one or more jobs or tasks. Job service module 118 may be used by unified context-aware content archive 112 in the processing of or enrichment of electronic communications. Workflow module 120 represents hardware and/or software elements configured for managing or orchestrating one or more workflows. Workflow module 120 may be used by unified context-aware content archive 112 in the processing of or enrichment of electronic communications. A workflow may include one or more jobs or tasks. In one example, a workflow includes a communication capture step, an enrichment step that determines information related to the communication, a processing step that transforms or processing information related to the communication, a normalization step that generates a normalized version of the communication, and a storage step that stores the communication in one or more forms.

Search service module 122 represents hardware and/or software elements configured for managing searches related to communications. Search service module 122 may be used by unified context-aware content archive 112 in the indexing and retrieval of electronic communications.

Data ingestion gateway module 124 represents hardware and/or software elements configured for managing the intact of electronic communications from email repository 106, unified communications service 108, and social networking service 110. Data ingestion gateway module 124 may provide security features, access control lists, and the like for maintaining the integrity of and records for stored communications.

Content storage service module 126 represents hardware and/or software elements configured for managing the storage and retrieval of normalized electronic communications. Content storage service module 126 provides a content-agnostic storage system for storing, managing, searching, integration data storage independent solutions using RDBMS, XML Repositories, File Systems, and Key-Value storage; aka Big Data storage.

Content store module 128 represents hardware and/or software elements configured for managing the storage and retrieval of primarily textual information related to electronic communications. Report service module 130 represents hardware and/or software elements configured for managing the generation of reports related to captured, indexed and stored communications. Index service module 132 represents hardware and/or software elements configured for managing the indexing of stored communications. Some examples of indexes may be full-text indices, semantic analysis, topic indices, metadata indices, and the like. Blob service 134 represents hardware and/or software elements configured for managing the storage and retrieval of primarily binary data, such as attachments to emails and instant messages, voicemails, blogs, network posts, and the like.

Long term storage module 136 represents hardware and/or software elements configured for managing the long term storage and retrieval of electronic communications. WORM storage module 138 represents hardware and/or software elements configured for managing data in long-term storage. For example, WORM storage module 138 may be a data storage device in which information, once written, cannot be modified. This write protection affords the assurance that the data cannot be tampered with once it is written to the device. Big data storage module 140 represents hardware and/or software elements configured for managing data sets with sizes beyond the ability of commonly used software tools to capture, curate, manage, and process the data within a tolerable elapsed time.

In general, unified context-aware content archive 112 provides for the capturing of multiple forms of communication. Specifically, unified context-aware content archive 112 provides for domain specific classification of information established around email, unified communication, collaboration, and social networks. In one aspect, unified context-aware content archive 112 classifies electronic communication mediums into the four distinct aforementioned categories such that they share common characteristics. Some examples of common characteristics are event-base timing signatures (e.g., an event is sourced, injected or derived by corresponding point in time; i.e., time of incident), participants engaging in one or more connected interactions or conversations (e.g., unique correlations of persons can be made via CMR module 114 or identity management module 116 allowing identity mappings to be sourced, derived, or inferred—additionally, mappings may also be derived from social graphs by crawling social networks or connections), linked correlations through time series analysis, linked correlations through participant associations, aggregation/clustering or localization across group membership, and the like.

Unified context-aware content archive 112 further stores the common characteristics of the communication modalities via a normalization process into a single information structure. In various embodiments, unified context-aware content archive 112 generates an interaction transcript model ("ITM") based on one or more electronic communications. The model is an entity that represents one or more interactions between one or more participants according to one or more communication modalities. As discussed above, unified context-aware content archive 112 is not merely archiving documents associated with electronic communications. Unified context-aware content archive 112 determines an interaction as a bounded definition of a series or sequence of events derived or inferred from a set of documents.

In one aspect, ITM provides a single point of normalization into unified context-aware content archive 112 for search-ability and expressiveness. The ITM can be tailored for eDiscovery pipelines and other applications. In one aspect, unified context-aware content archive 112 implements an extract-transform-load (ETL) process for electronic communications for data enrichment, deconstruction, information partition. Enrichment enables unified context-aware content archive 112 to reclassify information, inject and enrich metadata, and partition data across specialized medium store. Unified context-aware content archive 112 further allows for streamed and serialized content into underlying repository suitable for downstream indexable content and analytics.

In various embodiments, unified context-aware content archive 112 provides searchable content based on contexts derived or inferred via "Attribute Normalization" across disparate storage system. Unified context-aware content archive 112 implements or otherwise creates and index that allows for conversations correlation between participants and derivations of relationships (participant to messages, participants to participants, message to participants). In one aspect, unified context-aware content archive 112 provides for searchable content based on time frames, derivation or inferred contexts via sequenced ordering of events corresponding to each distinct event, derivation or inferred contexts via chronologic events corresponding to each distinct event, and derivation or inferred contexts via linked to participants in question, derivation or inferred contexts via term association or referenced in messages or binary artifacts such as attachments, archive resources (tar, gzip, b2, etc), derivation or inferred contexts via shallow and deep analytics requiring data and process mining techniques, and the like.

In various embodiments, unified context-aware content archive 112 determines one or more interaction contexts. Unified context-aware content archive 112 can capture, model, derive, synthesize, and visualize interactions through use of heuristics and algorithms using time-series and semantic analysis to capture, archive, and search for business records based on contexts of time-stamp, and person-based identity mapping. An interaction context helps derive or infer additional information, such as event signified by key attributes such as timestamp, a global unique identification, a sequence number, a modality of event signifying whether it is open or closed, information derived or inferred by a person's identity, derived or inferred social graphs based on communication connections between participants (i.e., linked interactions), and the like. An interaction context can further help derive or infer information such as expressiveness of an event correlating to the interaction by means of metadata injection for data in motion, data at rest, and metadata tagging, meta-meta models, metadata for identity mapping, metadata for messages, and data enrichment via flow injection techniques. Injection can happen at live traffic capture, proxy capture using non-governed devices, network events, transport flows, and application flows.

Figure 2:
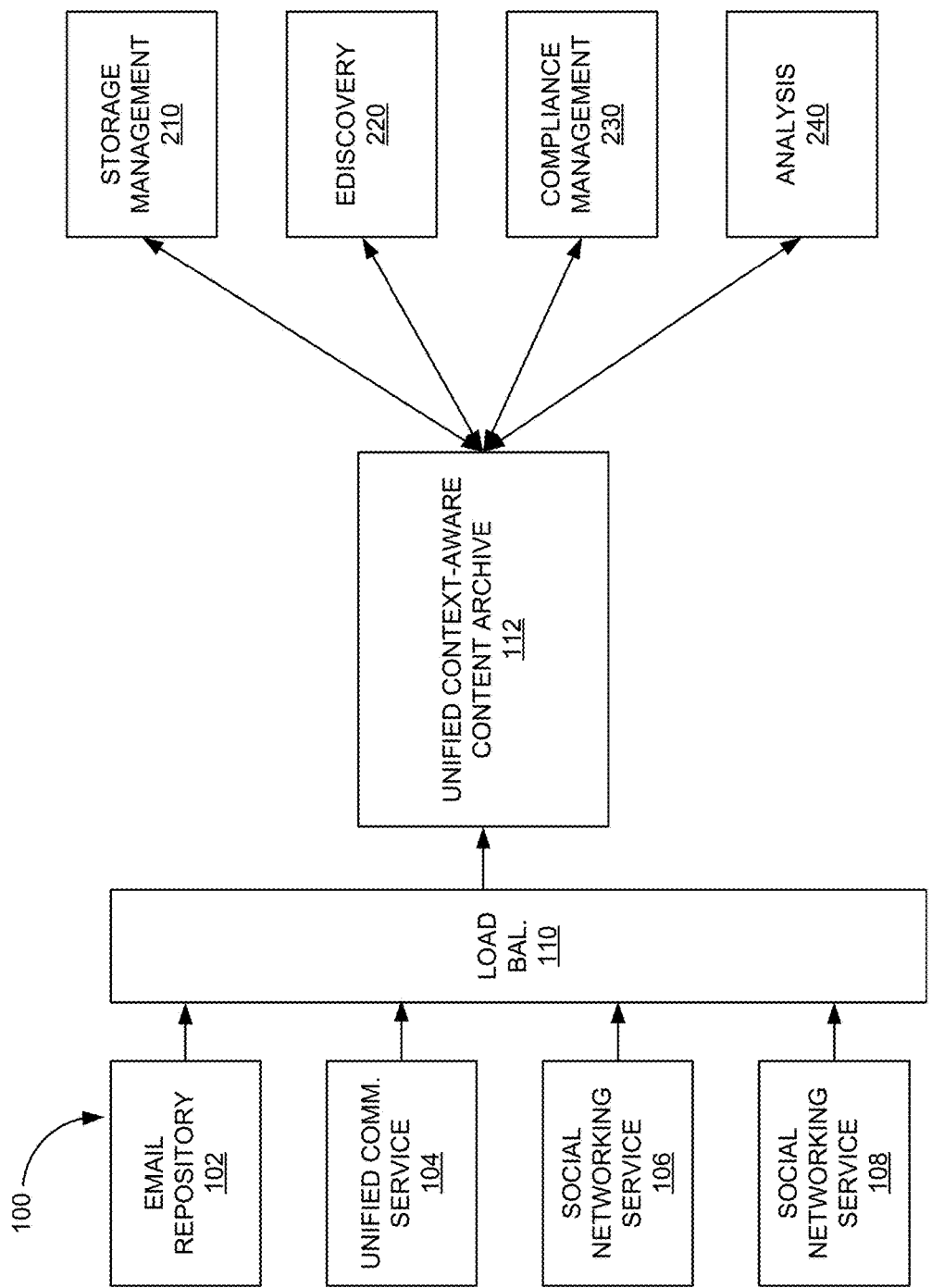
FIG. 2 is a block diagram illustrating different applications of the electronically stored information system of FIG. 1 according to various embodiment of the present invention.

FIG. 2 is a block diagram illustrating different applications of ESI system of FIG. 100 according to various embodiment of the present invention. In this example, unified context-aware content archive 112 may be deployed in the cloud. Communication modality infosets and business record events may be sent to unified context-aware content archive 112 using a variety of protocols, such as HTTP/S Transport and SMTP Transport for Email Journal. The communication modality infosets undergo a normalization process by unified context-aware content archive 112 to unify the infoset into a coherent structure that represents an interaction transcript model ("ITM"). As discussed above, unified context-aware content archive 112 may include one or more engines that allow for data enrichment, data partitioning and segregation into underlying storage medium, and data indexing whereby content index is generated based on data domain context.

In various embodiments, unified context-aware content archive 112 may be managed by storage management module 210. Storage management module 210 represents hardware and/or software elements configured to manage aspects of the operation of unified context-aware content archive 112.

In some embodiments, unified context-aware content archive 112 may be integrated with eDiscovery module 220, compliance management module 230, and analysis module 240. eDiscovery module 220 represents hardware and/or software elements configured for managing eDiscovery processes, such as an identification phase when potentially responsive documents are identified for further analysis and review, a preservation phase where data identified as potentially relevant is placed in a legal hold, a collection phase where once documents have been preserved, data can be transferred for processing (e.g., by legal counsel) to determine relevance and disposition, a processing phase where data is prepared to be loaded into a document review platform, a review phase where documents are reviewed for responsiveness to discovery requests and for privilege, and a production phase. In one aspect, eDiscovery module 220 may interface directly with the search capabilities and aggregated results provided by unified context-aware content archive 112.

Compliance management module 230 represents hardware and/or software elements configured for managing compliance requirements faced by an organization. In one aspect, compliance management module 230 may interface directly with the search capabilities and aggregated results provided by unified context-aware content archive 112. Analysis module 240 represents hardware and/or software elements configured for analyzing the stored information. A variety of analytics may be performed to determine information related to communications, modalities, participants, contexts, and the like.

Figure 3:
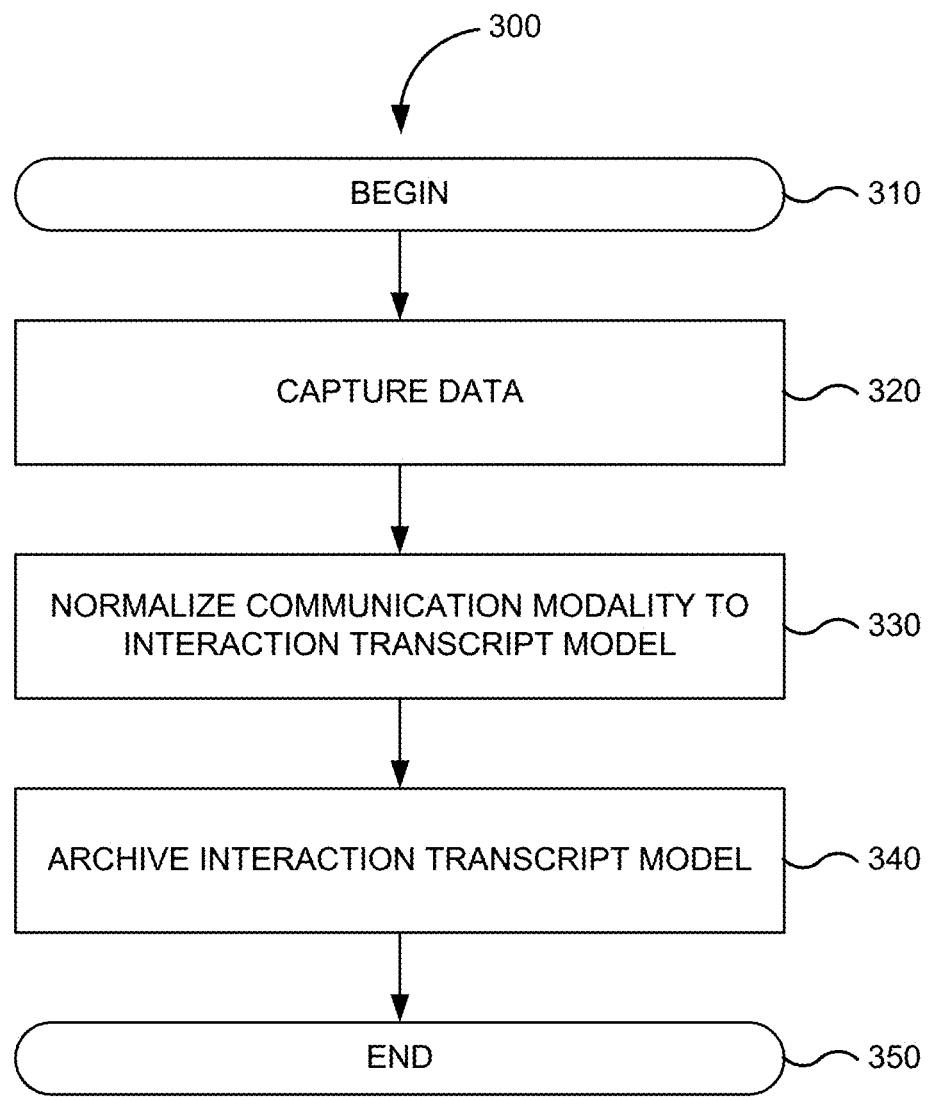
FIG. 3 is a simplified flowchart of a method for archiving content in a context-aware manner according to one embodiment of the present invention.

FIG. 3 is a simplified flowchart of method 300 for archiving content in a context-aware manner according to one embodiment of the present invention. Implementations of or processing in method 300 depicted in FIG. 3 may be performed by software (e.g., instructions or code modules) when executed by a central processing unit (CPU or processor) of a logic machine, such as a computer system or information processing device, by hardware components of an electronic device or application-specific integrated circuits, or by combinations of software and hardware elements. Method 300 depicted in FIG. 3 begins in step 310.

In step 320, data is captured. As discussed above, multiple communication modalities are captured. In step 330, each communication modality is normalized to an interaction transcript model. Communication mediums can be classified into the four distinct aforementioned categories according to shared common characteristics. Infosets for multiple communication modalities are the normalized into the single information structure. In some embodiments, infosets may undergo processes for data enrichment, deconstruction, and information partitioning. In step 340, the interaction transcript model is then archived. FIG. 3 ends in step 350.

Data Flow and Process

Figure 4:
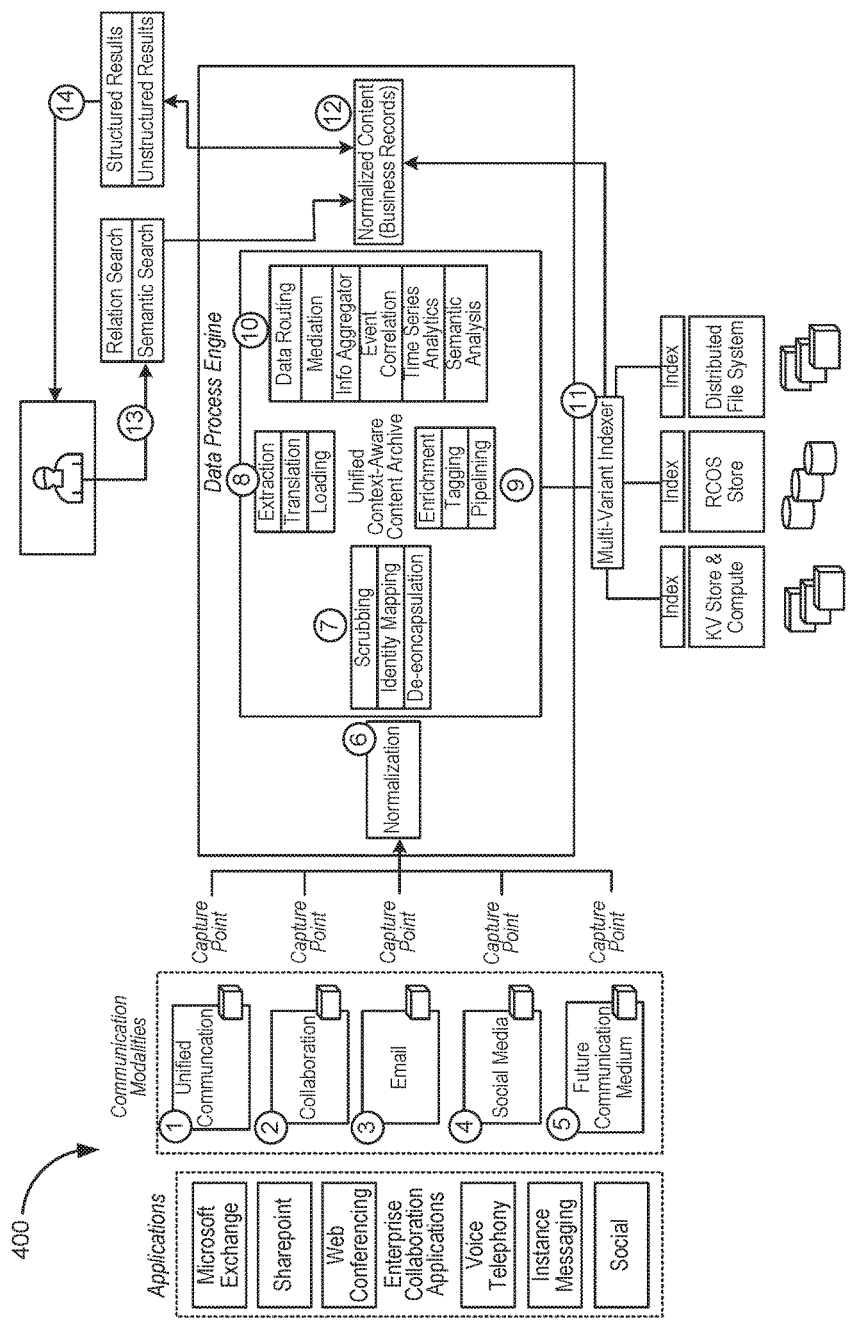
FIG. 4 is a block diagram illustrating an overview of a flow in terms of data and process in electronically stored information system of FIG. 1 according to one embodiment of the present invention.

FIG. 4 is a block diagram illustrating an overview of a flow in terms of data and process in ESI system 100 of FIG. 1 according to one embodiment of the present invention. In this example, circles with a numeric value indicate a step of interest in the overview of the flow. In steps 1-5, communication modalities are captured from numerous applications/devices at a variety of generalized or specific capture points. Some examples of applications and devices from which communication modalities may be captured include, Microsoft Exchange/Outlook, Gmail, Hotmail, Lotus Notes, etc., SharePoint, IBM Connections, Web Conferencing such as WebEx, Skype, Microsoft Communication Server, Voice Telephony, Cisco Phones, Cell Phones, Mobile Phones, iOS, Android running on Mobile Devices, Tables, Slates, Instance Messaging, Microsoft Messenger, Salesforce Chatter, Jive, Social Media, Facebook, LinkedIn, Twitter. Each capture point, in essence, tracks the "dialogs" between humans and devices. A capture point may enrich the information to further provide the interaction context for downstream discovery (search, data/process/behavior/semantic mining, analytics, reporting, etc.)

In various embodiments, capture points of communication modalities can be information retrieval systems that allow a user to retrieve information having different attributes from heterogeneous application sources. In one embodiment, a capture point is an agent that extends additional information for the purposes of deriving context. A searchable context then can be associated with the information based on enriched attributes of a subject represented by a user's interaction on a system with one or more humans by way of device communication. As discussed above, the context-oriented information model is normalized and stored.

Figure 5:
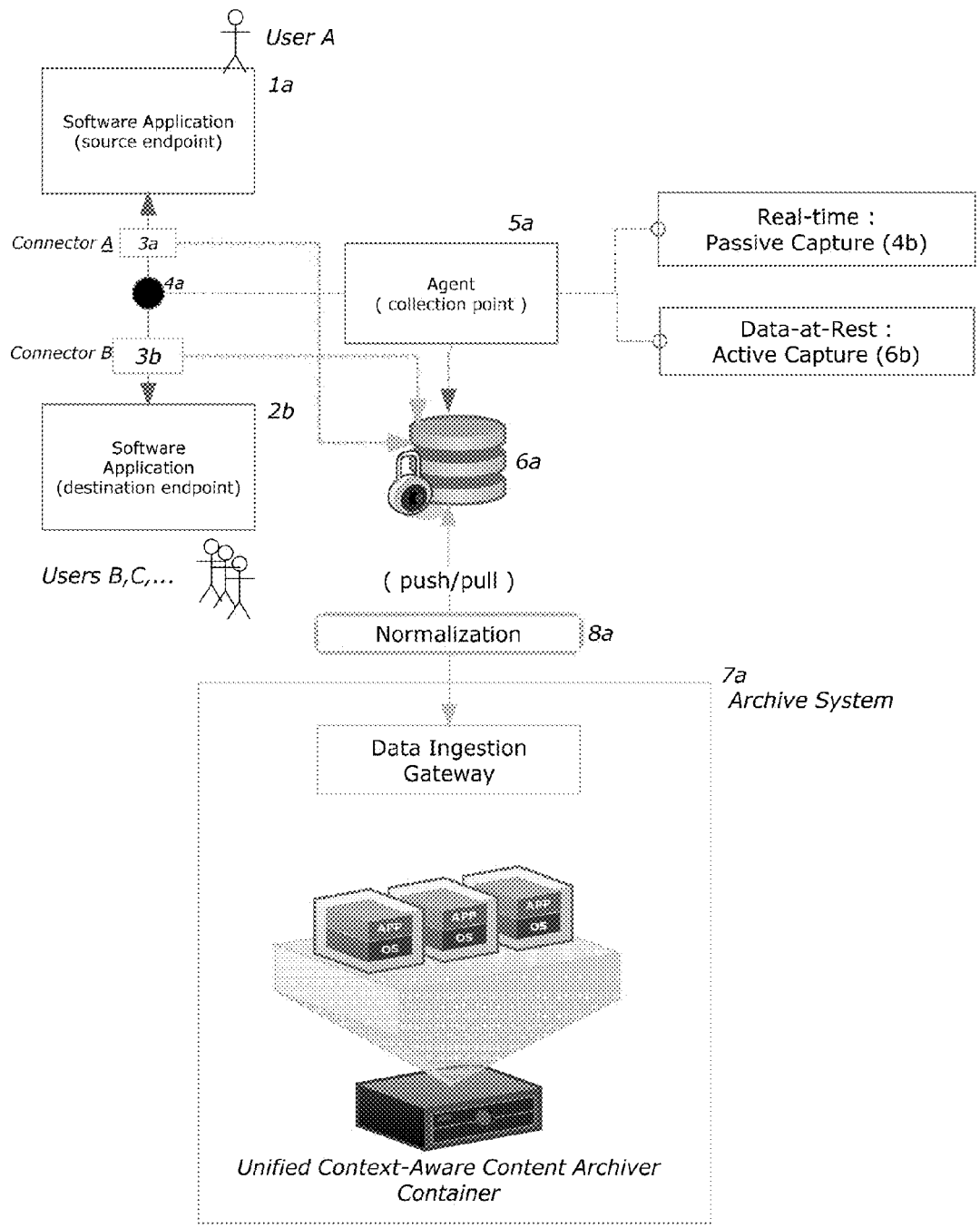
FIG. 5 is a diagram illustrating an overview of capture point data flow according to one embodiment of the present invention.

FIG. 5 is a diagram illustrating an overview of capture point data flow according to one embodiment of the present invention. FIG. 5 provides for two methods used to enrich information derived from various communication modalities.

In a first, entitled real-time (Data-in-Transit) passive capture, ESI system 100 provides for passive capture that denotes the ability inspect packets (datagrams) over the wire without interference or requiring explicit data injection (enrichment) by the participating device communications being used by one or more users, the participants, on a network transport. Device communication means the broad-spectrum of the target applications, running services, physical (stationary computer) or communication/mobile device residing on a network transport (the wire) used as the pathway to communicate to another endpoint (communication device).

In one aspect, ESI system 100 may utilize a wire tap to intercept the communication. For example, device (4b) is used to collection information in real-time by sniffing data over the wire and collects the data at agent (5a) at a capture/collection point. A data repository or connector is linked to agent (5a) to track user ids inspected by the wire tap. In one example, a session id is derived and tracked for user A's "interactions" with other users on the network. User credentials can be interrogated, validated, and depending on policies established by agent (5a) approved. In some aspects, a user ID is mapped to an employer id. In another aspect, a user ID is mapped to a buddy list (use of aliases or display names as account information supplied by user to connect to out-bound communication devices or software applications).

All electronic information (media: text, document, voice, audio, messaging, etc) are collected into repository (6a). Once a document is resident (at rest), an enrichment process may take place on the captured electronic information as a business record. Some examples of enrichment are the determination and processing of event ids, transaction ids, correlation ids, links to connected events (prior/previous), participant ids, communication ids (information about the communication id), timeframe of conversation, information of all users involved in the originating communication, information of all file events (related file uploads, attachments, etc), information of all text events (the primary context of the initiating communication; e.g., body of text, message, instant message, etc.), information derived from user session tracking, and the like.

Once data is enriched, an interaction context can be generated. The interaction context corresponds to an open-closed event which signifies the full scripts of text events, file events and corresponding participant events. This data is packaged and prepared for archiving.

In a second, entitled (Data-at-Rest) active capture, ESI system 100 provides explicit intervention by software agents to enrich data along the pathway of communication between end points (users & device communications). Usually, this is done via an API or SPI complying with a well defined protocol. In one aspect, ESI system 100 enriches data at the point of capture using the application sources (end points) used as a mean to facilitate and mediates the communication pathways between users. This is done typically be adding a connector to the source application which allows for direct insertion of metadata to the collection repository (6a) using a software development toolkit ("SDK"). Accordingly, one or more connector are installed at application sources (end points). An API or SPI is made available from a software development toolkit is used to enrich the data and business records are stored in a collection repository via a binding protocol to submit normalized data.

Referring again to FIG. 5, in step 6, a normalization process occurs for captured communication modalities. In this example, normalization is governed by an API protocol that allows source applications via connectors or installed agents. The process of normalization may take place at a source installation of agent (5a).

In this example, a business record is extracted from a agent's repository containing business records of interest. An infoset described by meta model (XML Schema) is pushed to a Data Ingestion Component. This normalized transcript under goes an ETL process for de-encapsulation of business records performed by the DPE staging pipeline. Information is then derived from the normalized transcript. An interaction context is generated whereby metadata about the events, start time, end-time, communication, event id is determined. Furthermore, derived information may include a collection of participant events, a collection of text events, a collection of file events, or the like.

With the application of social media domains (large scale networks; Facebook, LinkedIn, Twitter, Microsoft, Google, Applet, Bloomberg, etc.), the unified context-aware content store generates meaningful contexts of activities (interaction between participants, consumers, business entities, etc.) in real-time. In one aspect, meaningful contexts may be generated of (interaction between participants, consumers, business entities, etc.) at capture points—passive processing. In another aspect, search-ability of "normalized context" is improved by bridging all forms of communication into a single context (the conversation of interest for the business records).

In further embodiments, the unified context-aware content store provides an efficient application of storage. Data is not stored in traditional document form but rather virtualized into a coherent storage infrastructure that allows direct access and searchable content to data (document, binary, etc), structure storage, and unstructured storage.

Document Reconstruction

This disclosure generally relates to computing and replaying correlated, time-series event-driven electric data in a form of a compound document structure for search, analytics and visualization. In one aspect, application of a visualization derived from analyzing corpus stored by the archive is provided.

Generation of a conversation timeline for eDiscovery purposes is a feature lacking in most applications especially in the context of providing augmented context beyond traditional forms of communication corpus such as emails. Most archive solution available today deal specifically with email documents. The unified context-aware content archive system as described herein provides a broader approach and techniques for storing and analyzing the corpus of electronic communications to enable better insights into the data being stored. In one aspect, a conversation timeline is generated against any form of communication that is fed into the unified context-aware content archive system.

In various embodiments, systems and methods are provided for processing a snapshot reconstruction operations (e.g., using a processing engine of the universal context-aware content archive) while users are generating communication transcript events to the archive system. Heuristics, algorithms, or other monitoring mechanisms are used to detect event changes that occur during the construction of a snapshot in order to maintain data integrity consistency between related data in communication transcripts. In some embodiments, a corresponding significant snapshot operation is continually processed for new changes; particularly for related data that has been modified during construction of prior snapshots. In one aspect, each introduction of a new event results in a newly created snapshot. This can be performed as an updated snapshot, or a complete reconstruction of a new document structure.

In one aspect, a method is provided. A snapshot operation of data including varying form of communication transcript as an event is initialized. Modification to one or more items, a subsequent snapshot operation is performed for the modified items. The construction of the snapshot is completed. If a modification occurred to one or more transcript items, a most signification snapshot is determined and performed for the modified items.

Implementation of the method can include one or more of the following features. The method can further include determining which items of data are related. The monitoring for modifications can include identify event notification associated with an item of the various form of transcript events. Performing a snapshot operation can include replacing the previous data for a transcript with prior data from the previous snapshot. The method can further include monitoring for modification to one or more transcript events of related items in the snapshot definition including determining a maximum number of event operations to perform to complete a snapshot reconstruction without modification occurring during the snapshot processing. If the maximum number of snapshot construction is reached, an alert can generated including notifying the user or system. If the maxim number of snapshot operation is reached, the snapshot operation can be suspected for a predefined period of time. The resumption of processing is determined by conditions such as out-of-band work-context events, failed stages within the process, etc.

Figure 6:
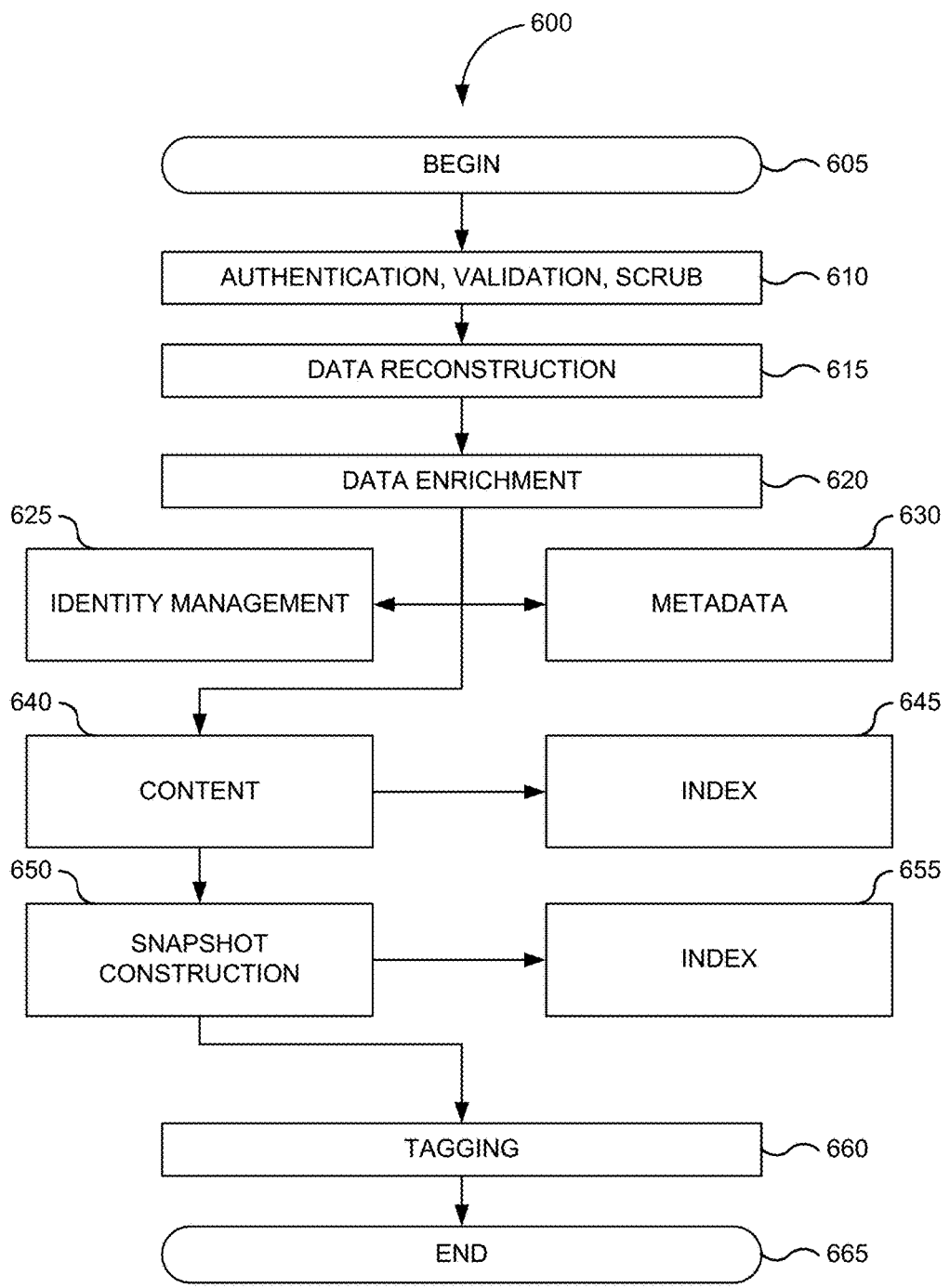
FIG. 6 illustrates an archival pipeline for snapshot construction in one embodiment according to the present invention.

FIG. 6 illustrates archival pipeline 600 for snapshot construction in one embodiment according to the present invention. Implementations of or processing in archival pipeline 600 depicted in FIG. 6 may be performed by software (e.g., instructions or code modules) when executed by a central processing unit (CPU or processor) of a logic machine, such as a computer system or information processing device, by hardware components of an electronic device or application-specific integrated circuits, or by combinations of software and hardware elements. Archival pipeline 600 depicted in FIG. 6 begins in step 605.

In this example, a capture point may be installed at a customer's site (also referred to as a source collection point). The capture point captures communication data to be submitted to unified context-aware content archive 112. Each document sent to unified context-aware content archive 112 is stored in a form of a normalized transcript document (e.g., ITM).

In step 610, each document is authenticated, validated, scrubbed for key characteristics. This information can be used to augment any later enrichment processes. In one aspect, a document is authenticated and validated to determine proof of the documents. For example, metadata may be included that was given by a credible entity who has evidence of or can be relied upon for the document's identity. Additionally, evidence may be provided by the originator of the document. In another example, attributes of a document may be compared to what is known about other documents from the same source. As attribute comparison may be vulnerable to forgery, therefore one or more techniques such as digital certificates and encryption may be used to cause any forgeries to be readily distinguishable from a genuine document. In another aspect, authentication may rely on documentation or other external affirmations, such as establishing a chain of custody or the like. In other aspects, a document may be validated for the purposes of structure or content. In further aspects, a document may be scrubbed to complement missing data or sanitized to remove miscellaneous, irrelevant, confidential, or privileged information. In some embodiments, step 610 further includes storing a copy of original data for compliance purposes.

In step 615, each document is deconstructed. For example, a document may be sliced and diced into one or more segregated data domains. Some examples are metadata, participant data, content processing, indexing, snapshot construction & indexing, and tagging. In one aspect, a document format may be identified and parsed into one or more predefined document fields. In another aspect, one or more document sections may be encoded or decoded. In step 620, each document may have its data or metadata enriched as discussed above to facilitate processing with the data domains.

In step 625, identity management is performed. One or more tasks may be performed to determine information about entities or users associated with or referenced by a document. Such information may include information that authenticates the identity of a user or information that describes information and actions a user is authorized to access and/or perform. Descriptive information about a user may be collected and extracted across a variety of documents. In some embodiments, a digital identity for users or entities is generated and may be augmented by external sources, such as corporate directories or other user information repositories.

In step 630, metadata is generated for each document. The metadata provides information about each document, and may include metadata already provided with or in a document. In step 640, content is extracted from each document. In step 645, the extracted content is indexed. In step 650, snapshot construction is performed as described further below. In step 655, each snapshot is indexed.

In step 660, one or more specialized tagging processes can be performed that allow external application processes (e.g., retention management, disposition, ediscovery, supervision, doc reviews, etc) to take fuller advantage of the information contained in each snapshot in a form usable by the applications.

Constructing the Data Model for the Snapshots

In various embodiments, a snapshot service is provided as a stage in the ingestion pipeline of the unified context-aware content archive system. The snapshot service generates a canonical model "Snapshot" from a list of conversation transcript documents (e.g., those ingested from capture points). A snapshot provides an archive representation of the context-ware capture of any related communication context and content tied together by metadata. This allows for broad applications of search and visualization purposes. The list of conversation transcript documents to be replayed for snapshot generation is based on the global communication id and the timestamp of the snapshot i.e. the point in time for which the snapshot needs to be created. All transcript documents that hold events up until this timestamp value may be considered for re-construction of events to generate the snapshot. The snapshot stage supports snapshot event pagination and filtering.

In general, a compound document termed a snapshot is provided at the end of the ingestion pipeline. This compound document or snapshot is an archive representation of the context-aware capture of the related communication context together with any content tied together by metadata. This allows for broader applications of search and visualization than available with the raw content. In one aspect, unified context-aware content archive 112 may provide correlation contexts consisting of a Global communication identifier, a time frame, a subject/topic of a conversation/interaction, and a sequence or services of action events on an individualized communication transcript. In various aspects, actions include (post, create, update, delete, attach, edit, reply, submit, reviewed, opened, etc.)

Text-Event Replay for Snapshot Construction

Text events are events associated with textual context data tied principally to the communication objects. For example, an email communication object has the standard attributes of the document:

Sender, body, subject, cc:, bcc:.

The text event we would refer is the body of the email document.

Text Events contained within each conversation transcript document that have been considered for snapshot generation may be re-processed one at a time in the order the documents have been stored in the document container within the storage system. Note that these documents can be stored in any order within the document container. No assumption is made about the chronological order of timestamps. Rather the timestamp is taken from the conversation transcript (ITM structure). When this condition is met, the documents eligible for snapshot generation may be based on the requested snapshot's global communication id and whose timestamp value is less than or equal to the timestamp value as requested for the snapshot.

Figure 7:
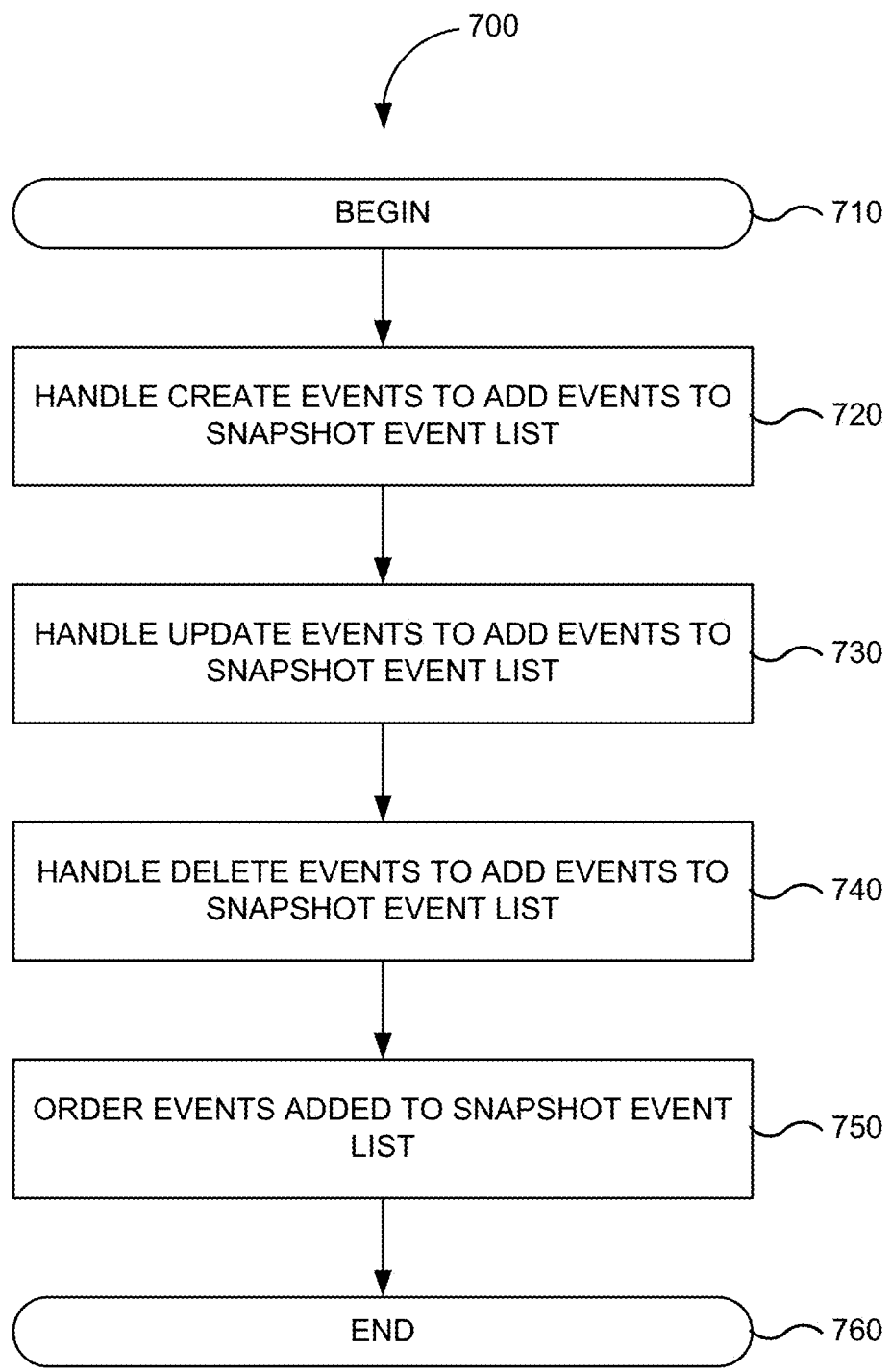
FIG. 7 illustrates a flowchart of a method for text event replay for snapshot generation in one embodiment according to the present invention.

FIG. 7 illustrates a flowchart of method 700 for text event replay for snapshot generation in one embodiment according to the present invention. Implementations of or processing in method 700 depicted in FIG. 7 may be performed by software (e.g., instructions or code modules) when executed by a central processing unit (CPU or processor) of a logic machine, such as a computer system or information processing device, by hardware components of an electronic device or application-specific integrated circuits, or by combinations of software and hardware elements. Method 700 depicted in FIG. 7 begins in step 710.

In step 720, CREATE events are handled. For example, if an UPDATE event with the same Text Object Id already exists, then the "create-time" and "creator-participant-id" fields of the UPDATE event may be updated from the CREATE event. If a DELETE event with the same Text Object Id already exists, then the "create-time" and "creator-participant-id" fields of the DELETE event may be updated from the CREATE event and the TextContent of the DELETE event may be populated from the CREATE event. If neither UPDATE nor DELETE events exist for the same Text Object Id, then the CREATE event is added to a Snapshot Events list.

In step 730, UPDATE events are handled. For example, if a CREATE event with the same text object id already exists, the textual content of the CREATE event may be replaced with that of the UPDATE event. The "update-time" and "updater-participant-id" fields may be updated from the UPDATE event and the text object type may be changed to UPDATE. If a DELETE event with the same text object id already exists, the textual content of the DELETE event may be populated from the UPDATE Event. If neither CREATE nor DELETE events exist for the same text object id, then the UPDATE event is added to the snapshot events list.

In step 740, DELETE events are handled. For example, if a CREATE event with the same text object id already exists, the "update-time" and "updater-participant-id" fields may be updated from the DELETE event and the text object type may be changed to DELETE. If an UPDATE event with the same text object id already exists, the "update-time" and "updater-participant-id" fields may be updated from the DELETE event and the text object type may be changed to DELETE. If neither CREATE nor UPDATE events exist for the same text object id, then the DELETE event is added to the Snapshot Events list.

In step 750, events in the Snapshot Events list are ordered. FIG. 7 ends in step 760.

Event Ordering Methodology

In various embodiments, a parent-child relationship for each of the Snapshot events may be created and stored in a map. In one aspect, a key will hold the snapshot event object id (could be file event/text event object id) which may be mapped to a list of its immediate child snapshot events. After the parent-child relationship has been stored for all events, a second pass may be made through each map entry and the list of child events for each entry may be sorted based on ascending order of snapshot event create-time. This snapshot event hierarchical map may then be flattened into list of individual snapshot events. This flattened list may be built by recursively traversing through each snapshot event of the hierarchical map starting from the root level child events. As part of the recursion, if an event at any level holds other child events, then those child events may be added to the list first before adding the child events of the next event at the same level. The snapshot events will then be returned to the snapshot service consumer in the same order as their order in the flattened list.

The following is an example to illustrate the above described ordering methodology. Consider the following sample text events of a Blog Post:

P1 (Post1)
    C1P1 (Comment1 on Post1)
        R1C1P1 (Reply1 on Comment1 for Post1)
        R1'C1P1 (Updated Reply1 on Comment1 for Post1)
    C2P1 (Comment2 on Post1)
        R1C2P1 (Reply1 on Comment2 for Post1)
        R1C2P1 (Deleted Reply1 on Comment2 for Post1)

Figure 8:
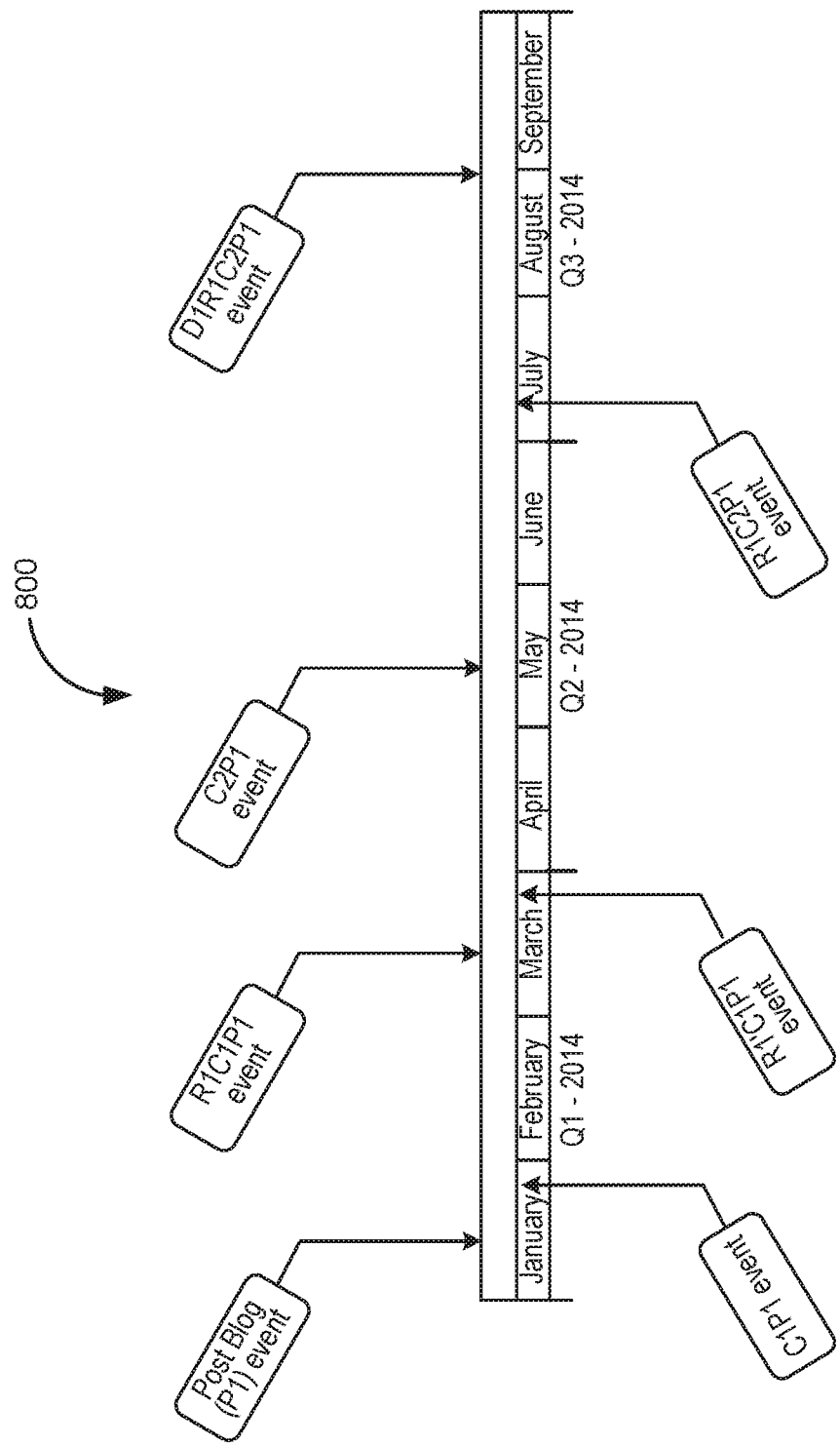
FIG. 8 illustrates one example of a visualization of an ordered sequence of events in one embodiment.
Figure 9:
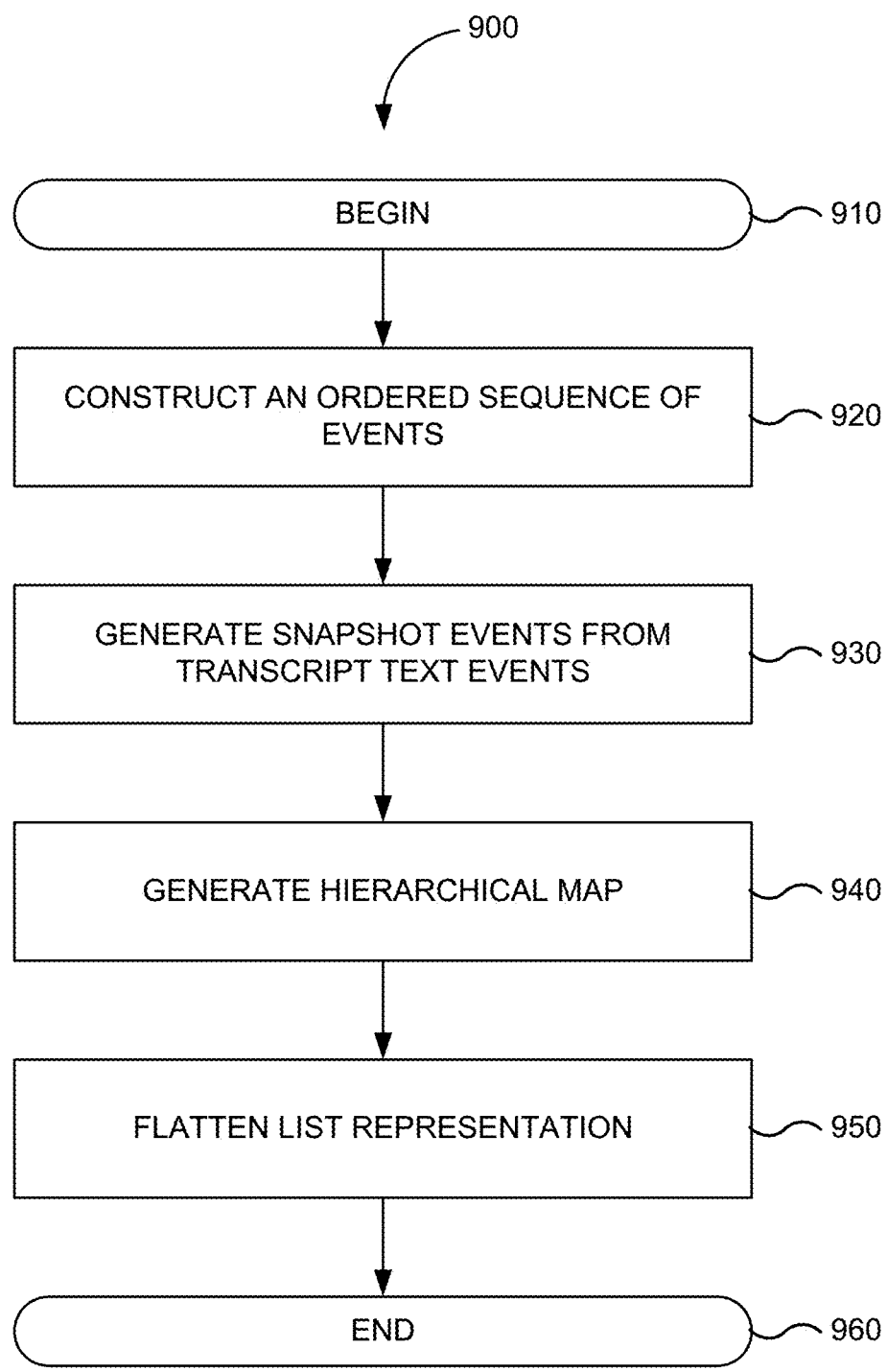
FIG. 9 illustrates a flowchart of a method for text event replay for snapshot generation in one embodiment according to the present invention.

FIG. 8 illustrates one example of a visualization of the ordered sequence of the above events. FIG. 9 illustrates a flowchart of method 900 for text event replay for snapshot generation in one embodiment according to the present invention. Implementations of or processing in method 900 depicted in FIG. 9 may be performed by software (e.g., instructions or code modules) when executed by a central processing unit (CPU or processor) of a logic machine, such as a computer system or information processing device, by hardware components of an electronic device or application-specific integrated circuits, or by combinations of software and hardware elements. Method 900 depicted in FIG. 9 begins in step 910.

In step 920, an ordered sequence of events is constructed. Using the above example, the following list is generated using method 700 of FIG. 7.

```
List {
    P1TextEvent,
    C1P1TextEvent,
    R1'C1P1TextEvent, [The UPDATE event for R1C1P1 will only
get included since that was the latest event for the same Text Object Id]
    C2P1TextEvent,
```

```
R1C2P1TextEvent [The DELETE event for R1C2P1 will only
get included since that was the latest event for the same Text Object Id]
   }
```

In step 930, snapshot events are generated from transcript text events. The above list may be modified using the generated snapshot events as follows:

```
List {
      SnapshotEvent(P1TextEvent),
      SnapshotEvent(C1P1TextEvent),
      SnapshotEvent(R1'C1P1TextEvent), [The UPDATE event for
R1C1P1 will only get included since that was the latest event for the same
Text Object Id]
      SnapshotEvent(C2P1TextEvent),
      SnapshotEvent(R1C2P1TextEvent) [The DELETE event for
R1C2P1 will only get included since that was the latest event for the same
Text Object Id]
    }
```

In step 940, a hierarchical map is generated. Entries in a map after Snapshot Event replay may appear in the list in any order as well has since the transcript documents may exist in any order within the archive. The following hierarchical map may be generated:
C1P1->List{R1'C1P1TextEvent}
R1C1P1->List{ } [No child events]
P1 (root)->List{C2P1TextEvent, C1P1TextEvent} [Please note that the child events in this list are not sorted as per the create-time. They were added in this order during Snapshot Event reply.]
C2P1->List {R1C2P1TextEvent}
R1C2P1->List{ } [No child events]
A second pass provides the following map in which all the lists of child events are sorted based on one or more predetermined conditions, such as create-time.
C1P1->List{R1'C1P1TextEvent}
R1C1P1->List{ }
P1 (root)->List{C1P1TextEvent, C2P1TextEvent} [This List is now sorted as per the event create time.]
C2P1->List {R1C2P1TextEvent}
R1C2P1->List{ }
In step 950, the list representation is flattened as described above. FIG. 9 ends in step 960.

FIG. 10-14 provides an example of snapshot generation for a blogging application which has streamed a series of communication transcript events to the unified context-ware archive content archive system in one embodiment according to the present invention.

Figure 10:
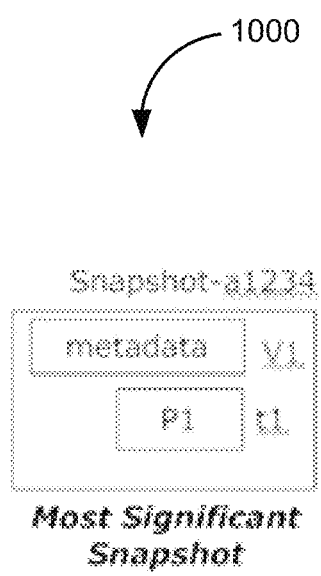
FIG. 10 illustrates a snapshot generated in response to a blogging application streaming a create event for a blog in one embodiment.

FIG. 10 illustrates snapshot 1000 generated in response to the blogging application streaming a create event for a blog. In this example, since no document associated with the blog have been created or seen in the unified context-ware archive content archive system, the system creates a container object called a snapshot document. The snapshot document is sourced with a global unique identifier and provides a transcript event that encapsulates the communication object pertaining to the blog. For example, the transcript event includes information about the user ("participant"), post-event, creates date, the content of the blog, etc.

At this point, a snapshot capturing that fact that a user Jane posted a blog has been created. In this example, the blogging application can be tracked via the global-communication-id thus allowing each communication form the blogging application to be tied to that source. P1 reflects the first point event from an interaction transcript event/model generated to represent the interaction of the user Jane in creating the blog that can be stored in the unified context-ware archive content archive system. All metadata and associated content and related attachments are captured by this structure. Also, the snapshot is versioned 1. The transcript event is sorted and organized by time t1. The first data point in the time series. At this point, the most significant snapshot is snapshot 1000.

Figure 11:
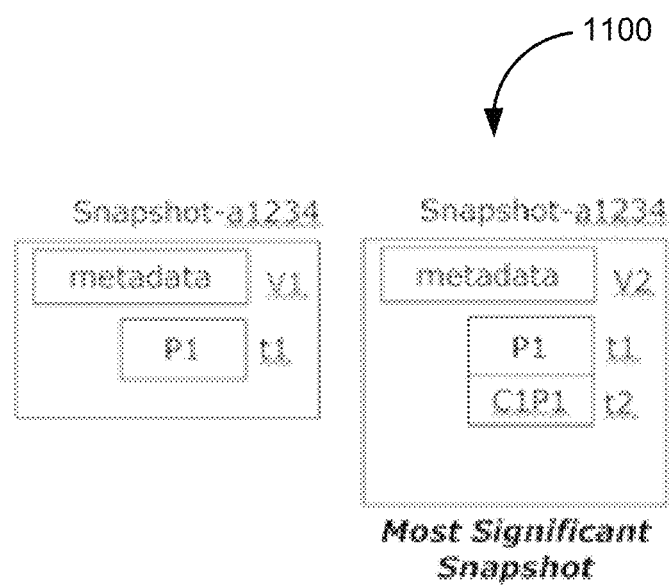
FIG. 11 illustrates a snapshot generated in response to a blogging application streaming a comment event for a blog in one embodiment.

FIG. 11 illustrates snapshot 1100 generated in response to the blogging application streaming another event for the blog. In this example, a user Bob subsequently makes a comment on the blogging system. The comment is attached to the blog post made by Jane. The interaction transcript event/model generated to represent the posting of the comment by Bob arrives in the unified context-ware archive content archive system at time t2 and snapshot 1100 is generated. This is where the "living" document comes into play. The unified context-ware archive content archive system keeps track of and monitors each original snapshot derived from an incoming transcript document. The unified context-ware archive content archive system correlates each transcript event to a given snapshot. In this case, one already exists because the comment relates to the post that originated from Jane.

Figure 12:
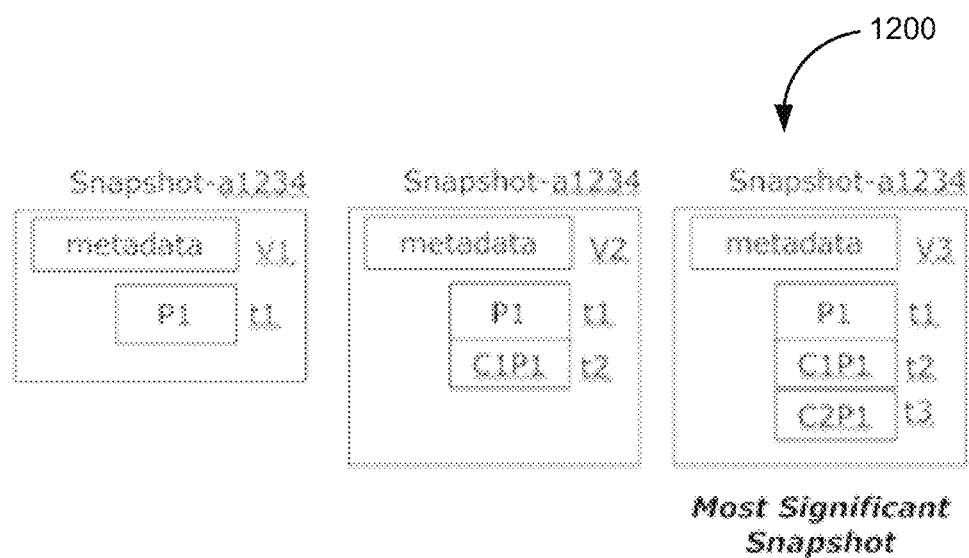
FIG. 12 illustrates a snapshot generated in response to a blogging application streaming another comment event for a blog in one embodiment.

FIG. 12 illustrates snapshot 1200 generated in response to the blogging application streaming another event for the blog. In this example, Jill comments on the original post identified by P1. She is effectively the second responder. At this point, a transcript event corresponding to Jill commenting to her original post is generated and arrives at T3 into the unified context-ware archive content archive system. Again, the transcript event is correlated to snapshot-a1234 in the system. The existing snapshot contains two transcript events, (1) from Jane the originator of the post, and (2) comment from Bob, the replier. At this junction, by referring to the snapshot-a1234 construction (e.g., by peeking into the archive or classically "compound" document), a new transcript event corresponding to Jill who made an additional comment to the original post is added. The most significant snapshot now points to version v3, doc-id "a1234". Every new event yields may result in a change in state and consequently may require an update to the materialized artifact "snapshot."

FIG. 13 illustrates snapshot 1300 generated in response to the blogging application streaming another event for the blog. In this example, Jack, a fourth user in the blogging community, decides to reply to Bob's comment which relates to the original post. In this case, Bob's reply is rather abusive and violates the spirit of the law regarding the blogging community. Nevertheless, a transcript event is passed into the unified context-ware archive content archive system for real-time processing. The unified context-ware archive content archive system opens the compound document identified by "a1234" and adds a new transcript event thus expanding the scope for conversation in context by the blogging application. The snapshot is now versioned to 4, and the most significant snapshot points to this document.

FIG. 14 illustrates snapshot generated in response to the blogging application streaming another event for the blog. In this example, the moderator, Amber, decides the blog policies has been violated by Jack. She has no choice but to delete the comment with prejudice. She is the moderator and administrator after all. Furthermore, she wants to control the potential uproar by the blogging community. Now we arrive at the presently final transcript event denoting the delete event by Amber. The unified context-ware archive content archive system opens the compound document identified by "a1234" and adds a new transcript event containing the deleted content in question. The snapshot document is updated with a new version (5), and contains the newly added transcript event. Note, though the actual content is deleted from the blogging system, the transcript is captured and recorded in the snapshot structure identified below. This is but one example of a useful application for discovery and analytics.

Because any new transcripts may come at any given time, (for example now, in 4 hours, next week, one year from now, 5 years from now, or . . . never,) the living document framework handle situations like this. For any given incoming event, the received transcript is correlated to a snapshot and augmented with any new pieces of information. If no snapshot exists, the unified context-ware archive content archive system primes a snapshot structure by creating or enveloping a transcript event into the snapshot structure.

Once snapshots are materialized, the corpus is built up over time and stored efficiently in the unified context-ware archive content archive system. After which, search and visualization applications being hosted by the unified context-ware archive content archive system can gain insight to the context, content, and relationships. The searchability and discovery is unmatched due to the ability of the unified context-ware archive content archive system to map any forms of communication objects into a unified structure that can be represented and visualized similarly in the scenario described for blogging application. Also note, the blog is but one example. The same chain of events and the same materialization of snapshot structures can be applied for a variety of communication modalities such as email, enterprise messaging, persistent chats, social networks, instant messaging, web conferring applications, etc, as well as across modalities.

In some embodiments, the unified context-ware archive content archive system provides social journaling. The unified context-ware archive content archive system journals every event into a context identified by a snapshot (document re-construction process).

Snapshot Reconstruction Workflow

Figure 15A:
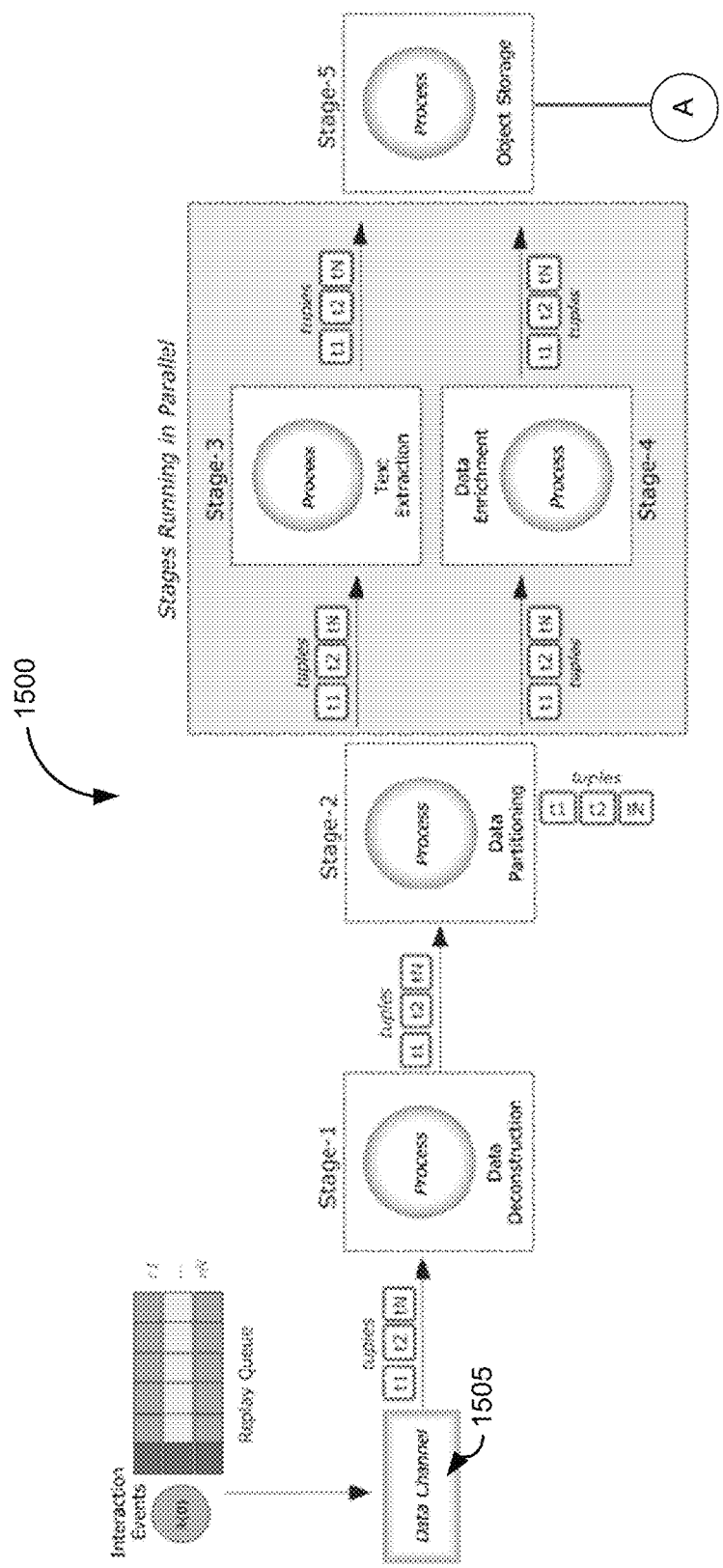
FIGS. 15A and 15B illustrate a workflow process providing for snapshot construction in one embodiment according to the present invention.
Figure 15B:
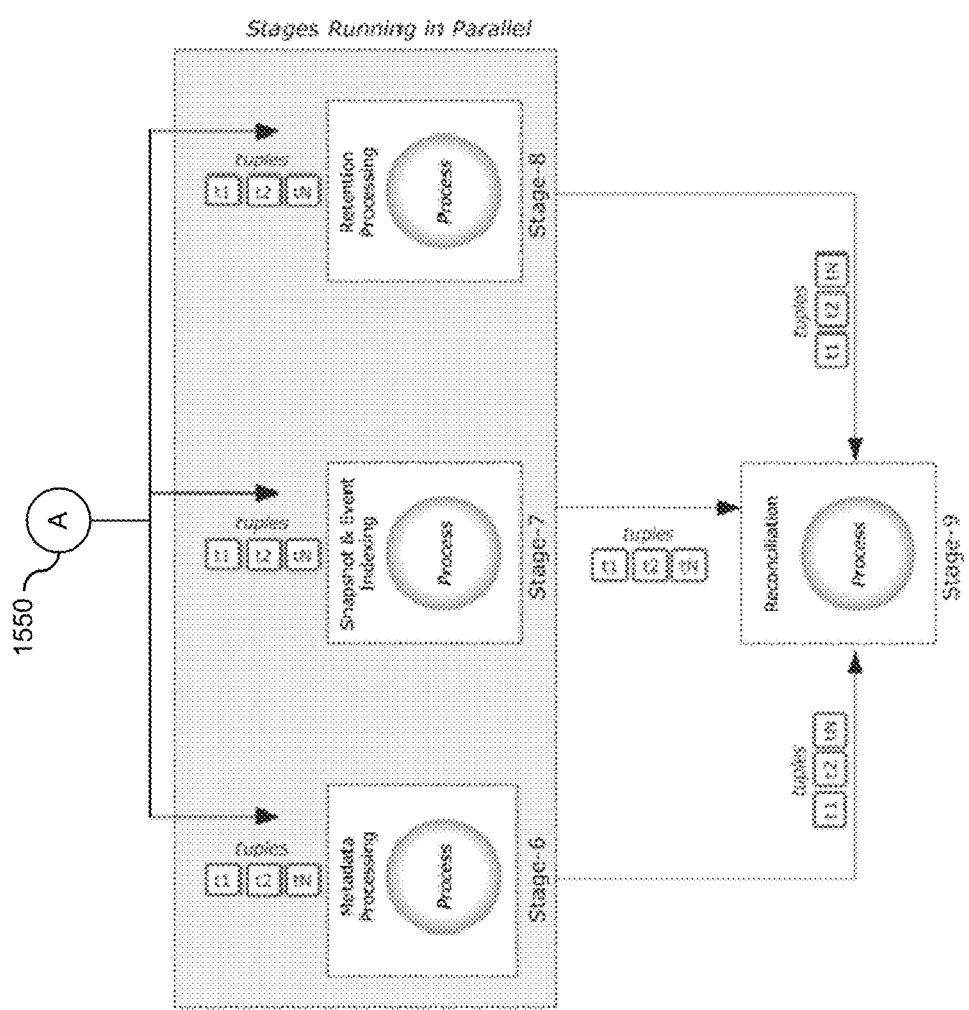

FIGS. 15A and 15B illustrate workflow process 1500 providing for snapshot construction in one embodiment according to the present invention. FIG. 15A is merely illustrative of an embodiment or implementation of an invention disclosed herein and should not limit the scope of any invention as recited in the claims. One of ordinary skill in the art may recognize through this disclosure and the teachings presented herein other variations, modifications, and/or alternatives to those embodiments or implementations illustrated in the figures. Implementations of or processing in workflow process 1500 depicted in FIG. 15A may be performed by software (e.g., instructions or code modules) when executed by a central processing unit (CPU or processor) of a logic machine, such as a computer system or information processing device, by hardware components of an electronic device or application-specific integrated circuits, or by combinations of software and hardware elements. Workflow process 1500 depicted in FIG. 15A begins in step 1505.

In step 1505, a process is bound and attached to one or more data sources. In this example of workflow process 1500, the process which binds to a data source represented as a queue (i.e. replay queue). A data source can be implemented by any apparatus, software, or combination thereof that provides one or more streams of data. The semantics of the queue as used herein makes no difference. Some examples of a queue in include a web service, a database, an external application (EIS), a file service using FTP, a webDAV protocol, etc. In various embodiments, transmission of data is facilitated by communicating in the form of tuples (e.g., a sequence of tuple records).

In Stage 1—Data Deconstruction, workflow process 1500 inspects a sequence of tuples for context information. As discussed above, context information may include the communication modality, associated metadata, and the like. If no in-stream or in-sequence context information is available, workflow process 150 may inject context information via a sub-process called enrichment as discussed above.

Stage 1 may further include performing a set of tasks. Some examples of tasks at this stage include data scrubbing, verification of tenancy information, ACL compliance, validity of datagram in terms of structure, metadata-content, communication content in the form of attachment, file documents (video, audio, text, etc.), gleaning participant information, event correlation checks, checksum/data tampering checks, file/object/document de-dup processing, decryption/encryption for downstream processing, and the like.

In Stage 2—Data Partitioning, workflow process 1500 constructs translated data models based on context. In one aspect, workflow 1500 specifies the glue for context-routing that allows optimization of the data domain for underlying storage. Routed storage may be, Big Data repository, Relational Database system, DFS; an example is HDFS provided by hadoop, Object storage, File repositories for stream or batch processing, and the like.

Once a domain model is identified in stage 2, workflow process 1500 compresses and serializes the data into an object that is configured to be passed from stage to stage. In one aspect, an efficient in-memory format is chosen that can be distributed across server farmers, nodes, etc. In another aspect, each tuple can be executed independently to maximize parallelism. The output of stage 2 is feed into a sub-process that allows for parallel execution of stage 3 (text extraction) and stage 4 (data enrichment). The output of stage 3 and stage 4 are then merged into a single tuple stream for further process in Stage 5.

Referring again to stage 3—Text Extraction, workflow process 1500 takes any raw content associated with an interaction event represented by the compressed and serialized object and performed one or more textual processing techniques thereon. Some examples include indexing, topic discovery, building word clouds, and the like. In state 3, workflow process may further classify embedded documents, objects that associated with an email attachment, file uploads, sharepoint uploads, video file, audio files associated with a telephony call, etc. Accordingly, all contents (binary or text) may be subject to at least one text extraction process to establish a context for context search. In one aspect, body of text is pushed to stage 5 allowing, for example, further indexing once an entire snapshot replay is captured.

In Stage 4—Data Enrichment, workflow process 1500 executes one or more data enrichment processes independently of any processed in Stage 5. Stage 4 is bounded by the input of stage 3 and the output for stage 5. In stage 4, workflow process 1500 implements at least a primary process to allow any opportunity for enrichment through the injection of metadata. Metadata is varied but the primary purpose is to add in-context information not otherwise available in-stream by accessible through other sources. Context metadata may come from event correlation processing, deriving relationships, looking at past context or traversing interrelated documents, objects referenced by the attributes that link everything together, and the like. In one aspect, a linkage is generated known as a global communication id (GID) and an associated timestamp is created as the create-date (or start-date) associated with a communication object representing an interaction event.

FIG. 15A ends in stage 5—Object Store, where workflow process 1500 processes all incoming events. Content is serialized into permanent durable storage for archival purposes as discussed above with respect to unified context-aware content archive 112 and is discussed further with respect to FIG. 15B.

FIG. 15B is merely illustrative of an embodiment or implementation of an invention disclosed herein and should not limit the scope of any invention as recited in the claims. One of ordinary skill in the art may recognize through this disclosure and the teachings presented herein other variations, modifications, and/or alternatives to those embodiments or implementations illustrated in the figures. Implementations of or processing in workflow process 1500 depicted in FIG. 15B may be performed by software (e.g., instructions or code modules) when executed by a central processing unit (CPU or processor) of a logic machine, such as a computer system or information processing device, by hardware components of an electronic device or application-specific integrated circuits, or by combinations of software and hardware elements. Workflow process 1500 depicted in FIG. 15B begins in step 1550.

In Stage 6—Metadata Processing, workflow process 1500 employs a variety of tools and techniques to look for opportunity to mine and store metadata separate from the indexing and object store associated with prior stages. In one aspect, information used in heuristics is recorded to manage bookkeeping tasks and to perform fast calculation for in-context relationships, content metrics, participant information, and the like.

In various embodiments, for example, workflow process 1500 builds a global buddy list associated with every participant found in the ingested data. All email addresses, network-endpoint ids and the like are tracked and stored as a mechanism to manage and preserve a unique identity about an individual. For example, Jane Doe is gleaned from the interaction event discussed above with respect to the blogging example. All interaction events associated with Jane Doe are subsequently tracked and stored, for example, using an LDAP-like structure. By way of example, workflow process 1500 may gather Jane Doe's enterprise email account (jane.doe@example.com), gmail account (Jane_doe@gmail.com, facebook account (wordgirl11434@facebook.com), linked-in account (doejane1943@linkedin.com), etc. Workflow process 1500 looks for and discovers patterns and hints derived by introspecting the content and metadata of an interaction event.

In further embodiments, workflow process 1500 tracks metric/stats information specific to information related to or otherwise associated with an interaction event. For example, an email may have 2 text events and 3 attachments. Typically, an email has the body of the email, and optionally text at the footer called a signature. Any embedded images and the associated 3 attachments are catalogued and captured for downstream reporting and analytics.

In Stage 7—Snapshot Index, workflow process 1500 accounts for in-stream messages (interaction events) and tracks associated book keeping and builds up context information to derive snapshots. In various aspects, visualization of this information model can be performed by an external visualization application using search and analysis as part of the document & event discovery process. In a Preprocessing Phase, workflow process 1500 sorts, filters, or performs a variety of tasks necessary to downsize, format, or arrange information being fed to into one or more consuming tasks, such as a snapshot replay task and indexing tasks. These preprocessing tasks can be executed independently and therefore maximize parallelism.

In a Snapshot Replay Phase, workflow process 1500 builds a timeframe starting with the origin of an initial interaction event and the last known time point (the end time point), such as a timestamp associated a the most recent associated interaction event. For example, in a blog application with a global communication id of 1234-blogger-acme, workflow process 1500 may have stored 20 discreet interaction event each which has t0, t1, . . . , t20 data points corresponding to the communication object (e.g., the blog content). Each time slice t0, t1, . . . t20 has an associated event action (created blog, reply, edit, update, edited, modified, etc.). The snapshot replay task derives the most significant snapshot defined with a timeframe of t0 through t20. As new interaction event objects are processed, the timestamp and associated GID of the interaction event are mapped to 1234-blogger-acme. Workflow process 1500 then computes a new snapshot timeframe and moves the time point to t0 to t21. Hence a new significant snapshot.

In an Indexing Phase, workflow process 1500 performs one or more types of indexing. Indexing of a document may be done as a record entry for each event that is being processed. Metadata may further be indexed sufficient to express snapshot information in a manner suitable to allow the ability to search timeframes within a snapshot or the entire spectrum of the correlated events.

In Stage 8—Retention Processing, workflow process 1500 determines or calculates a retention policy on an interaction event (object, document, etc). For example, a policy may require that all documents tracked must maintain information about retention. The need to manage documents and objects may be defined by strict retention compliance rules. In various embodiments, retention policies are calculated and tagged accordingly. This allows for execution of the disposition service which is executed at any point in time during the ingestion process. Careful rules and semantics are put in place so that when documents are being updated, deleted; these actions are not interfered with the deletion of documents when the policy dictates as such.

In Stage 9—Reconciliation, workflow process executes one or more tasks that reconcile every single interaction event starting from stage 1 through 9. Typical activities include, verifying and validating referential integrity, reconciling counts in terms of document processed and failed, generating and executing two phase commit for a transaction log which serves as a system of records for all activities associated with the interaction event, starting with stage 1.

Conclusion

In various embodiments, methods and systems for archiving a plurality of communication modalities are provided such that information associated with each of the plurality of communication modalities is captured. The information may include documents representing electronic communications and metadata associated therewith. The information can be stored in a plurality of interaction transcript models that normalize interactions between participants that have been derived or determined from the documents into a common information structure. In one aspect, contexts associated with the interactions can be determined and searched enhancing the archival of the different communication modalities.

Figure 16:
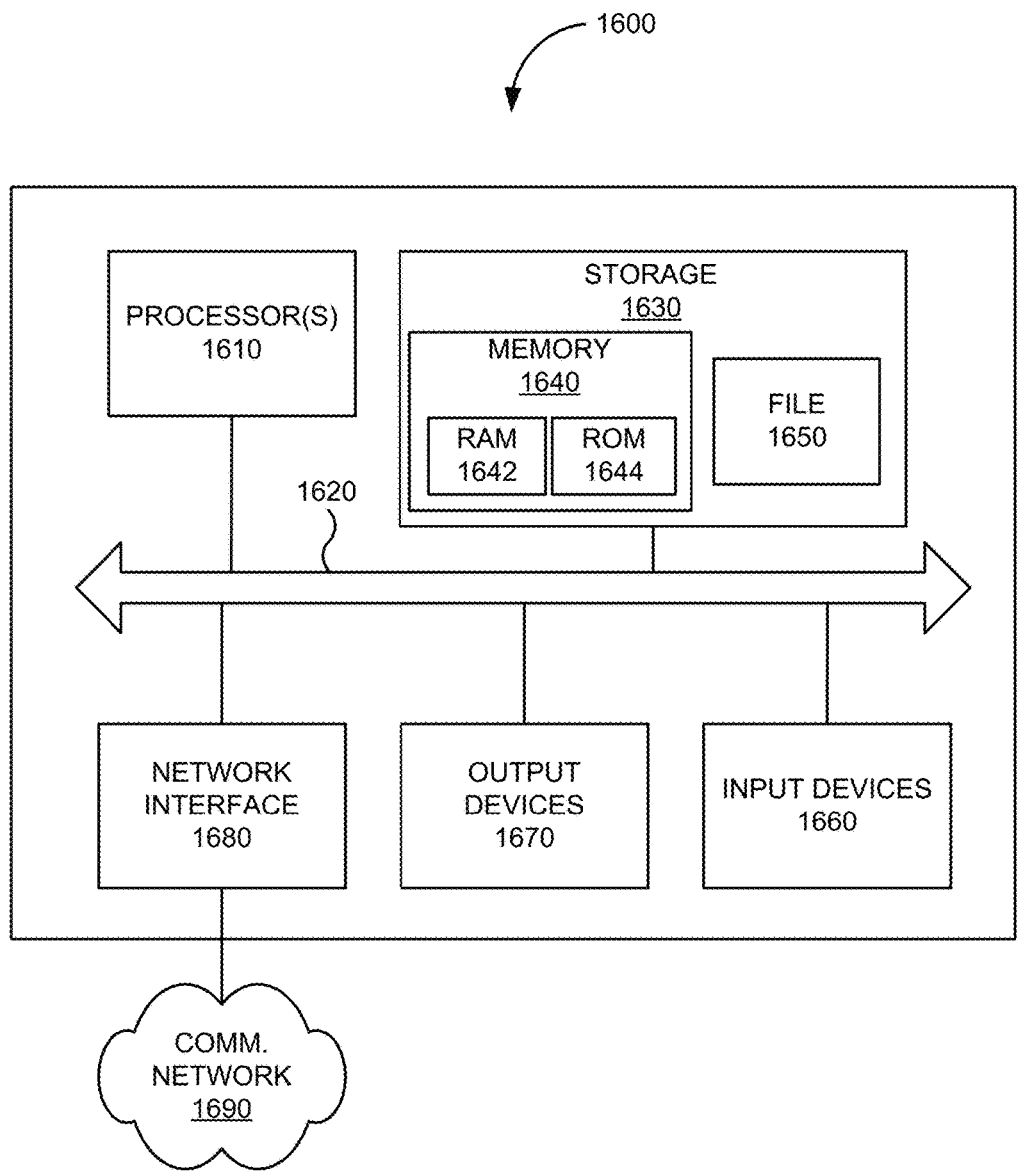
FIG. 16 is a block diagram of a computer system that may be used for archiving electronically stored information according to one embodiment of the present invention.

FIG. 16 is a block diagram of a computer system 1600 in an exemplary implementation of the invention. In this example, the computer system 1600 includes a monitor 1610, computer 1620, a keyboard 1630, a user input device 1640, one or more computer interfaces 1650, and the like. In the present embodiment, the user input device 1640 is typically embodied as a computer mouse, a trackball, a track pad, a joystick, wireless remote, drawing tablet, voice command system, eye tracking system, and the like. The user input device 1640 typically allows a user to select objects, icons, text and the like that appear on the monitor 1610 via a command such as a click of a button or the like.

Embodiments of the computer interfaces 1650 typically include an Ethernet card, a modem (telephone, satellite, cable, ISDN), (asynchronous) digital subscriber line (DSL) unit, FireWire interface, USB interface, and the like. For example, the computer interfaces 1650 may be coupled to a computer network 1655, to a FireWire bus, or the like. In other embodiments, the computer interfaces 1650 may be physically integrated on the motherboard of the computer 1620, may be a software program, such as soft DSL, or the like.

In various embodiments, the computer 1620 typically includes familiar computer components such as a processor 1660, and memory storage devices, such as a random access memory (RAM) 1670, disk drives 1680, and system bus 1690 interconnecting the above components.

The RAM 1670 and disk drive 1680 are examples of tangible media configured to store data such as embodiments of the present invention, including executable computer code, human readable code, or the like. Other types of tangible media include floppy disks, removable hard disks, optical storage media such as CD-ROMS, DVDs and bar codes, semiconductor memories such as flash memories, read-only-memories (ROMS), battery-backed volatile memories, networked storage devices, and the like.

In various embodiments, the computer system 1600 may also include software that enables communications over a network such as the HTTP, TCP/IP, RTP/RTSP protocols, and the like. In alternative embodiments of the present invention, other communications software and transfer protocols may also be used, for example IPX, UDP or the like.

It may be readily apparent to one of ordinary skill in the art that many other hardware and software configurations are suitable for use with the present invention. For example, the computer may be a desktop, portable, rack-mounted or tablet configuration. Additionally, the computer may be a series of networked computers. Further, the use of other micro processors are contemplated, such as Pentium™ or Core™ microprocessors from Intel; Sempron™ or Athlon64™ microprocessors from Advanced Micro Devices, Inc; and the like. Further, other types of operating systems are contemplated, such as Windows®, WindowsXP®, WindowsNT®, or the like from Microsoft Corporation, Solaris from Sun Microsystems, LINUX, UNIX, and the like. In still other embodiments, the techniques described above may be implemented upon a chip or an auxiliary processing board (e.g. a programmable logic device or a graphics processor unit).

Various embodiments of any of one or more inventions whose teachings may be presented within this disclosure can be implemented in the form of logic in software, firmware, hardware, or a combination thereof. The logic may be stored in or on a machine-accessible memory, a machine-readable article, a tangible computer-readable medium, a computer-readable storage medium, or other computer/machine-readable media as a set of instructions adapted to direct a central processing unit (CPU or processor) of a logic machine to perform a set of steps that may be disclosed in various embodiments of an invention presented within this disclosure. The logic may form part of a software program or computer program product as code modules become operational with a processor of a computer system or an information-processing device when executed to perform a method or process in various embodiments of an invention presented within this disclosure. Based on this disclosure and the teachings provided herein, a person of ordinary skill in the art will appreciate other ways, variations, modifications, alternatives, and/or methods for implementing in software, firmware, hardware, or combinations thereof any of the disclosed operations or functionalities of various embodiments of one or more of the presented inventions.

The disclosed examples, implementations, and various embodiments of any one of those inventions whose teachings may be presented within this disclosure are merely illustrative to convey with reasonable clarity to those skilled in the art the teachings of this disclosure. As these implementations and embodiments may be described with reference to exemplary illustrations or specific figures, various modifications or adaptations of the methods and/or specific structures described can become apparent to those skilled in the art. All such modifications, adaptations, or variations that rely upon this disclosure and these teachings found herein, and through which the teachings have advanced the art, are to be considered within the scope of the one or more inventions whose teachings may be presented within this disclosure. Hence, the present descriptions and drawings should not be considered in a limiting sense, as it is understood that an invention presented within a disclosure is in no way limited to those embodiments specifically illustrated.

Accordingly, the above description and any accompanying drawings, illustrations, and figures are intended to be illustrative but not restrictive. The scope of any invention presented within this disclosure should, therefore, be determined not with simple reference to the above description and those embodiments shown in the figures, but instead should be determined with reference to the pending claims along with their full scope or equivalents.

What is claimed is:

1. A method comprising:
   receiving a request for a snapshot of a document at a previous point in time;
   identifying events associated with the document prior to the previous point in time, wherein the events include every event associated with a change in the document prior to the previous point in time, wherein an event of the events includes a deletion of at least a portion of the document, wherein each event of the events is separately stored in an archive, wherein the archive receives a first set of one or more events from a first communication modality and a second set of one or more events from a second communication modality, and wherein the archive processes each of the first set of one or more events and each of the second set of one or more events to a common format; and
   generating the snapshot by performing each event of the events, wherein the snapshot represents the document at the previous point in time.

2. The method of claim 1, wherein a change in the document includes an addition, a deletion, or a combination thereof.

3. The method of claim 1, wherein the first communication modality includes electronic mail, instant messaging, chat, web collaboration, video conferencing, voice telephone, social networks, or any combination thereof.

4. The method of claim 1, wherein the previous point of time is indicated by a time or an event.

5. The method of claim 1, further comprising exporting the snapshot in a format that provides for visualization using an e-discovery application.

6. A computer-program product tangibly embodied in a non-transitory machine-readable storage medium, including instructions that, when executed by the one or more processors, cause the one or more processors to:
   receive a request for a snapshot of a document at a previous point in time;
   identify events associated with the document prior to the previous point in time, wherein the events include every event associated with a change in the document prior to the previous point in time, wherein an event of the events includes a deletion of at least a portion of the document, wherein each event of the events is separately stored in an archive, wherein the archive receives a first set of one or more events from a first communication modality and a second set of one or more events from a second communication modality, and wherein the archive processes each of the first set of one or more events and each of the second set of one or more events to a common format; and
   generate the snapshot by performing each event of the events, wherein the snapshot represents the document at the previous point in time.

7. The computer-program product of claim 6, wherein a change in the document includes an addition, a deletion, or a combination thereof.

8. The computer-program product of claim 6, wherein the first communication modality includes electronic mail, instant messaging, chat, web collaboration, video conferencing, voice telephone, social networks, or any combination thereof.

9. The computer-program product of claim 6, wherein the previous point of time is indicated by a time or an event.

10. The computer-program product of claim 6, further comprising exporting the snapshot in a format that provides for visualization using an e-discovery application.

11. A system comprising:
    one or more processors; and
    a non-transitory computer-readable medium including instructions that, when executed by the one or more processors, cause the one or more processors to perform operations including:
       receive a request for a snapshot of a document at a previous point in time;
       identify events associated with the document prior to the previous point in time, wherein the events include every event associated with a change in the document prior to the previous point in time, and wherein an event of the events includes a deletion of at least a portion of the document, wherein each event of the events is separately stored in an archive, wherein the archive receives a first set of one or more events from a first communication modality and a second set of one or more events from a second communication modality, and wherein the archive processes each of the first set of one or more events and each of the second set of one or more events to a common format; and
       generate the snapshot by performing each event of the events, wherein the snapshot represents the document at the previous point in time.

12. The system of claim 11, wherein a change in the document includes an addition, a deletion, or a combination thereof.

13. The system of claim 11, wherein the first communication modality includes electronic mail, instant messaging, chat, web collaboration, video conferencing, voice telephone, social networks, or any combination thereof.

14. The system of claim 11, wherein the previous point of time is indicated by a time or an event.

* * * * *